United States Patent
Hermey et al.

(10) Patent No.: US 12,040,570 B2
(45) Date of Patent: Jul. 16, 2024

(54) COMPACT CONDUIT FOR CLEAN ROOM APPLICATIONS, AND CASING AND CLAMPING FIXTURES FOR SAID CONDUIT

(71) Applicant: IGUS GMBH, Cologne (DE)

(72) Inventors: Andreas Hermey, Hennef (DE); Dominik Barten, Meckenheim (DE)

(73) Assignee: IGUS GMBH, Cologne (DE)

( * ) Notice: Subject to any disclaimer, the term of this patent is extended or adjusted under 35 U.S.C. 154(b) by 415 days.

(21) Appl. No.: 17/310,035

(22) PCT Filed: Jan. 14, 2020

(86) PCT No.: PCT/IB2020/000047
§ 371 (c)(1),
(2) Date: Apr. 6, 2022

(87) PCT Pub. No.: WO2020/148596
PCT Pub. Date: Jul. 23, 2020

(65) Prior Publication Data
US 2022/0228676 A1  Jul. 21, 2022

(30) Foreign Application Priority Data

Jan. 14, 2019 (DE) .................... 20 2019 100 169.0
Jun. 11, 2019 (DE) .................... 20 2019 103 276.6

(51) Int. Cl.
*F16L 3/015* (2006.01)
*F16G 13/16* (2006.01)
(Continued)

(52) U.S. Cl.
CPC .......... *H01R 13/422* (2013.01); *F16G 13/16* (2013.01); *F16L 3/015* (2013.01); *F16L 3/26* (2013.01);
(Continued)

(58) Field of Classification Search
CPC .............. F16G 13/16; F16L 3/015; F16L 3/26
See application file for complete search history.

(56) References Cited

U.S. PATENT DOCUMENTS 3,160,175 A    12/1964 Laemmle
3,399,909 A *   9/1968 Ambrose ................ F16L 3/015
                                                        248/68.1
(Continued)

FOREIGN PATENT DOCUMENTS

DE          907548      3/1954
DE      102006019133    6/2007
(Continued)

OTHER PUBLICATIONS

Office Action from related Indian Appln. No. 202137033416, dated Feb. 20, 2023. English translation included.
(Continued)

*Primary Examiner* — Neil Abrams
(74) *Attorney, Agent, or Firm* — Grossman, Tucker, Perreault & Pfleger, PLLC

(57) ABSTRACT

A conduit for lines, such as cables or hoses, particularly in a clean room application. The conduit has an elongate, flexible casing which can be moved to and fro, particularly while forming a deflecting bend between two runs, and at least one receptacle for guiding at least one line, with each receptacle extending in the form of a channel in a longitudinal direction from a first end to a second end. One feature of the invention consists in the fact that the casing has, to the side on at least one receptacle, at least one functional zone extending in a longitudinal direction, which functional zone forms a seal with two interacting sealing profiles to ensure a dust-tight closure of an open state, in which open state a line can be inserted into or removed from the receptacle transversely to the longitudinal direction. A further feature consists in the fact that the individual casing has a fastening (Continued)

profile extending on another longitudinal side in the longitudinal direction for a detachable connection to a corresponding fastening profile of a further casing. The invention further relates to a special clamping device for connecting the end of the casing, which clamping device comprises a deformable pressure piece which protrudes at the end beyond a clamping piece and forms a corner protection.

21 Claims, 9 Drawing Sheets

(51) Int. Cl.
- *F16L 3/26* (2006.01)
- *H01R 13/422* (2006.01)
- *H01R 13/52* (2006.01)
- *H01R 13/627* (2006.01)
- *H01R 13/639* (2006.01)
- *H02G 3/04* (2006.01)
- *H02G 11/00* (2006.01)

(52) U.S. Cl.
CPC ......... *H01R 13/52* (2013.01); *H01R 13/6271* (2013.01); *H01R 13/639* (2013.01); *H02G 3/0462* (2013.01); *H02G 11/006* (2013.01)

(56) References Cited

U.S. PATENT DOCUMENTS

| | | | | |
|---|---|---|---|---|
| 4,614,383 A * | 9/1986 | Polley | .................. | H02G 11/006 312/273 |
| 4,669,507 A * | 6/1987 | Moritz | .................... | F16G 13/16 174/101 |
| 6,751,382 B2 | 6/2004 | McGarvey | | |
| 7,437,052 B2 | 10/2008 | Klein | | |
| 7,472,795 B2 * | 1/2009 | Dubon | .................. | H02G 3/128 211/26 |
| 7,784,259 B2 * | 8/2010 | O'Rourke | .............. | H02G 11/00 59/900 |
| 8,662,456 B2 * | 3/2014 | Komiya | ............... | H02G 11/006 248/68.1 |
| 8,882,052 B2 * | 11/2014 | Komiya | ............... | G02B 6/4461 248/62 |
| 9,368,951 B2 * | 6/2016 | Komiya | ............... | H02G 11/006 |
| 9,668,372 B2 * | 5/2017 | Chen | .................... | H05K 7/1491 |
| 9,751,382 B2 | 9/2017 | Satzger | | |
| 10,083,777 B2 | 9/2018 | Tetsuka et al. | | |
| 10,591,089 B2 | 3/2020 | Barten et al. | | |
| 11,811,154 B2 * | 11/2023 | Hermey | ............... | H01R 13/639 |
| 2006/0233513 A1 | 10/2006 | Klein | | |
| 2012/0205498 A1 | 8/2012 | Komiya | | |
| 2012/0228437 A1 * | 9/2012 | Tatsuta | ................. | H02G 11/006 248/49 |
| 2014/0305672 A1 | 10/2014 | Komiya | | |
| 2022/0149556 A1 * | 5/2022 | Hermey | ............... | H02G 3/0462 |
| 2022/0268372 A1 * | 8/2022 | Roessel | ............... | H02G 11/006 |

FOREIGN PATENT DOCUMENTS

| | | |
|---|---|---|
| DE | 102012100290 | 8/2012 |
| DE | 102012100533 | 8/2012 |
| DE | 102014104879 | 10/2014 |
| DE | 112017000173 | 1/2019 |
| EP | 1220398 | 7/2002 |
| EP | 1793151 | 6/2007 |
| JP | 2002-295421 | 10/2002 |
| JP | 2006-292171 | 10/2006 |
| JP | 2007-292312 | 11/2007 |
| JP | 2012-170245 | 9/2012 |
| JP | 2015-109750 | 6/2015 |
| JP | 2017-531141 | 10/2017 |
| WO | 02086349 | 10/2002 |
| WO | 2005/071284 | 8/2005 |
| WO | 2016042134 | 3/2016 |
| WO | 2017/140720 | 8/2017 |
| WO | 2017140720 | 8/2017 |
| WO | 2021/124954 | 6/2021 |

OTHER PUBLICATIONS

Office Action from related Singaporean Appln. No. 11202108321S, dated Mar. 29, 2023.
Decision to Grant from related Japanese Appln. No. 2021-540483, dated Jan. 10, 2023. English translation attached.
English translation of Office Action from related Japanese Appln. No. 2021-540483, dated Sep. 6, 2022.
International Search Report from corresponding PCT Appln. No. PCT/IB2020/000047, dated July, 1, 2020.
International Preliminary Report on Patentability from corresponding PCT Appln. No. PCT/IB2020/000047, dated Jun. 17, 2021.

* cited by examiner

COMPACT CONDUIT FOR CLEAN ROOM APPLICATIONS, AND CASING AND CLAMPING FIXTURES FOR SAID CONDUIT

FIELD

The invention generally concerns the field of line guide devices for lines like for example cables for signal or power supply or pneumatic or hydraulic hoses or the like, which are to be dynamically guided between two relatively moveable connecting locations of a machine or installation. In particular a dynamic line guide device is proposed, which is suitable for use in clean rooms, for example in semiconductor or flat-screen display manufacture, in pharmaceutical installations, in medical equipment and so forth. In such applications the release of particles by the line guide devices is particularly undesirable and has to be minimised to the greatest possible extent.

BACKGROUND

Energy guide chains are typical line guide devices but in the conventional link chain structure with rotary joints they are less suitable for clean room applications as such link chains themselves release particles in operation thereof due to abrasive wear. An energy guide chain which was further developed in that respect and which is suitable for a clean room situation was proposed in WO 02/086349 A1. That energy guide chain gives off markedly less abrasion by virtue of flexible joint connections.

A known problem however is that the lines guided in an energy guide chain which possibly suffers from low abrasive wear themselves release particles in operation thereof as they move, bend and rub against each other upon being displaced. Thus for example the sheaths of the cables themselves also give off particles to the surroundings upon displacement.

For that reason it is known for the lines to be dust-tightly encased. A number of line guide devices which were further developed for that purpose for clean room applications were proposed by the applicant in WO 2016/042134 A1. One of those solutions (see FIGS. 10 to 16 therein) has in the meantime become available under the trade name "e-skin" from the applicant (igus GmbH, D-51147 Cologne).

The present invention now specifically concerns a line guide device or line protection guide suitable for a clean room application, having an elongate flexible encasement which is reversibly or reciprocatingly displaceable, typically with the formation of a direction-changing arc between two runs between a first connecting location and a connecting location which is moveable relative thereto. In that case the proposed encasement has a number of receiving means of pronounced tubular configuration for guiding at least one line, wherein each receiving means extends channel-like in a longitudinal direction from a first end to a second end, with which the protective guide is mounted at the connecting locations.

Line protective guides of the general kind set forth of that type are available for example under the trade name "GORE® Trackless High Flex" from W. L. Gore & Associates, Inc or under the trade name "ChannelFLEX™" or "EcoFlex™" from Hitachi Cable America Inc. A variant of the last-mentioned line protective guide which is viewed here as the general state of the art involved is described for example in DE 10 2012 100 290 B4 and U.S. Pat. No. 8,662,456 B2.

Such line protective guides are technically of a simple structure and are of a light and compact construction. They have a considerable disadvantage in use for example in relation to WO 2016/042134 A1. A maintenance operation, in particular replacement of an individual line or an individual line strand within a line guide arrangement including a plurality of lines or a plurality of line strands is possible only with considerable effort. In particular replacement of individual lines or individual line strands by lines which were already suitably prefabricated with the desired plugs or couplings is in particular not possible on site. That would considerably simplify maintenance and reduce costs. In contrast thereto line guides of the general kind set forth are typically completely renewed as an assembly so that in that case intact lines also have to be replaced. In addition a subsequent modification to an installed line guide, for example for adding further lines, is not readily possible.

SUMMARY

With that background in mind a first object in accordance with a first main claim of the present invention is to propose a line protective guide which is of a relatively compact structure and/or which is low in weight and which at least partially overcomes the above-mentioned disadvantages.

The invention seeks in particular to simplify the replacement of individual lines or individual line strands and/or support chains which may optionally be employed.

In a further aspect independent of the main claim there is proposed an improvement in the end connections, in particular the clamping devices which are typically used, for line guide devices of the general kind involved, that is to say suitable for a clean room application, in particular reduces unwanted particle discharge in operation.

In a line protective guide of the general kind set forth it is proposed according to the invention that the encasement, in particular laterally at at least one receiving means, has at least one or more functional regions which extend in the longitudinal direction and which afford an additional function insofar as the receiving means can be opened and closed again if required. In that way individual lines and/or support chains can be replaced as required.

In practice in particular separate replacement of support chains which are possibly in use has proven to be advantageous as they usually fail or have to be replaced before the supply lines. Thus a hitherto usual complete replacement of the entire line protective guide can be avoided.

The term line strand is used in that respect to denote a bundle of lines, in particular lines which are interrelated. In particular partial replacement of individual line strands is envisaged here, which are received by one or more encasing units with one or more receiving means.

For that purpose in accordance with the invention in a first aspect it can be provided that the functional region provides a closure for opening and closing one or more receiving means so that one or more lines can be inserted or removed transversely to the longitudinal direction or laterally/radially, in particular without dismantling of the complete encasement. For that purpose the functional region can have in particular two cooperating closure profiles which are designed for closure in as dust-sealing relationship as possible and which permit an opened state of the receiving means, in which a line can be inserted or removed transversely to the longitudinal direction.

In addition according to a second aspect it can be provided that the or a functional region includes or forms a fixing strip for releasing or fitting at least a part of the encasement or a receiving means, as required. The fixing strip can basically be designed in accordance with any connecting principle, involving positively locking and/or force-locking engagement, for non-destructive releasable connection to a corresponding strip or cooperating functional region. The fixing strip can be designed in particular in the form of a fixing bar or fixing profile. In that respect the design configuration of the fixing strips is so selected that they are adapted to be connected to each other in a connecting direction transversely to the longitudinal direction, in particular perpendicularly to the longitudinal direction. In that respect the expression transversely to the longitudinal direction signifies in particular a connecting or joining direction in a plane perpendicular to the longitudinal direction of the individual channel-like receiving means so that an encasement serving as a replacement with fresh contents, for example fresh lines or in particular one or more fresh support chains can be easily fitted laterally to the rest of the arrangement which is already fitted in place without the remaining encasements having to be released or indeed dismantled from each other. In general for that purpose only the end connection, for example clamping devices there, are to be opened for the replacement operation.

Both concepts for functional enlargement equally allow subsequent replacement or retrofitment with a line which is already equipped with plug connectors, couplings or the like without the encasement overall having to be dismantled to prevent the escape of particles at the operating location, for example in the clean room. In the first aspect the line can be replaced without modifying the encasement. In the second aspect only a part of the encasement together with the lines in question or in particular one or more support chains to be replaced is changed. In that respect consideration is to be given both to replacement of an individual receiving means with one or more lines or support chains or replacement of an encasing unit with a line strand. An encasing unit respectively has at least one receiving means for one or more lines or a line strand or also for a support chain of per se known structure. The receiving means can be in particular of a tubular configuration.

Particularly in the case of applications involving longer travel distances or encasements it is advantageous if provided in a receiving means of at least one encasing unit is a support chain for supporting the encasement upon displacement. In that respect it is possible to use per se known support chains involving the structural configuration of link chains.

In an embodiment the encasement includes at least one encasing unit of soft-elastic or flexurally elastic plastic which is preferably in one piece. The encasing unit could also be of a multi-part composition, for example comprising two symmetrical half cases or tube portions which are similarly divided in the longitudinal section. A one-piece encasing unit is preferred here and can improve for example sealing integrity to prevent particle escape.

Wall thickness and material of the encasement are so selected that it is flexible enough for displacement. A plastic, in particular a thermoplastic, with a Shore hardness in the range of 20 Shore A (ShA 20) to 65 Shore D (ShD 65), in particular in the range of 50 Shore A (ShA 50) to 100 Shore A (ShA 100) is preferably considered as the soft-elastic or flexurally elastic plastic.

In a preferred configuration the at least one functional region is respectively connected in one piece to the encasing unit (so-to-speak releasable only by destruction thereof). For that purpose it can be produced directly in one piece with the encasing unit or also it can be produced separately and subsequently joined thereto in material-bonded relationship by a joining process, for example by a suitable thermal joining process, in particular welding. The context of the invention includes in particular separate manufacture of a "simplified profile" without functional region on the one hand and the functional region or fixing strip on the other hand, for example in each case by extrusion of various, particularly suitable plastics, in particular thermoplastics. The functional region, in particular the closure profile, can then be joined in material-bonded relationship in the longitudinal direction to the rest of the encasing unit to constitute one part, for example by a welding process for welding plastics.

In an embodiment the encasement is composed of a multiplicity of separate encasing units. In that case each encasing unit can respectively form precisely one receiving means and can respectively have a lateral fixing strip in one piece with the encasing unit, for example a bar or a profile.

In addition an encasing unit can also include a multiplicity of receiving means and can respectively have a lateral fixing strip in one piece with the encasing unit. In that way individual encasing units can be connected together in parallel to form an encasement. In a development in that respect each encasing unit can have two fixing strips which are in opposite relationship at both sides and which are in one piece with the encasing units and by means of which adjacent encasing units can be connected to each other in parallel relationship. The fixing strips can be designed for direct cooperation in mutually matching relationship, for example of a conjugate configuration or engaging into each other in positively locking relationship. They can also cooperate with a separate fixing bar which is used for fixing the encasing units together.

In a preferred configuration an encasement is formed by a multiplicity of encasing units which respectively have the same number or a differing number of receiving means. Optionally an individual encasing unit can in particular have so many receiving means that a line strand can be received by precisely one encasing unit. This advantageously makes it possible for individual line strands within an encasement to be replaced by replacement of the respectively associated encasing unit. In that respect the term line strand is used to denote in particular bundles or groups of functionally interrelated lines, for example grouped in accordance with susceptibility to wear or service life.

To reduce deformation in the direction-changing arc each receiving means has an elongatedly round or oval, in particular ogival, cross-section, with the fixing strips being arranged at the narrow sides.

Each encasing unit can also have laterally, in particular in opposite relationship to the fixing strip, two closure profiles which are in one piece with the encasing unit.

In an embodiment it can be provided that the closure profiles of an encasing unit are closable in positively locking and/or force-locking relationship by connection to the fixing strip of an adjacent encasing unit. In that way for example in the event of oversize of the closure profiles which engage into the oppositely disposed fixing strip it is possible to achieve a particularly robust closure without additional fitment steps. Alternatively adjacent encasing units can be respectively connected together in parallel by a separate flexible fixing bar which cooperates with the fixing strips. In that way release of the closure is separate from the fixing by the fixing strips, that is to say separation of an encasing unit cannot result in unwanted opening of the adjoining encasing unit so that no abrasive wear particles are unintentionally discharged.

A further embodiment provides that the encasing unit includes subdivisions which form a plurality of parallel receiving means and the encasing unit has a closure, in particular two closure profiles in one piece with the encasing unit. In that way inter alia the assembly effort in relation to applications with a large number of lines to be guided can be reduced as an individual encasing unit to be fitted is not provided for each line.

In an embodiment each receiving means preferably has an associated dedicated closure so that all lines remain separately accessible. For that purpose each receiving means can have a pair of cooperating closure profiles in one piece with the encasing unit. in that way each receiving means can be selectively and individually opened for lateral access and closed again When long guide lengths or particularly soft-elastic encasements or encasing units are involved it is possible to provide in at least one and preferably in two laterally outer receiving means a support chain, in particular comprising individual chain links, which is designed to predetermine a direction-changing radius for the direction-changing arc and/or to support a self-supporting run in the straight position.

In a preferred embodiment a fixing profile as the fixing strip is provided at each narrow side of the encasement, in the case of a subdivided encasing unit, in particular in each case in one piece therewith. Besides expandability in that way for example as a alternative to a support chain another kind of support device can be mounted externally to the fixing profiles of the encasement. This provides that no useable receiving passage is required for the support function. For that purpose a respective external support device can be connected to the fixing profile at each narrow side of the encasement, which support device is designed to involve a low level of abrasive wear in order to predetermine a radius of the direction-changing arc and/or to support a self-supporting run in the straight position. Preferably for that purpose each support device has a support band and abutment elements perpendicular thereto, in particular T-shaped abutment elements, the T-arms of which are in an abutment condition in the direction-changing arc radially inwardly or in the straight position. The carrier band is preferably at the height of the neutral fibre.

An embodiment provides that the encasement includes a multiplicity of separate and peripherally closed encasing units. In that arrangement each encasing unit can respectively form precisely one receiving means. Each encasing unit can have two fixing strips which are in opposite relationship at both sides and which are in one piece with the encasing units as functional regions for fixing purposes. In that case the fixing strips can be adapted for positively locking cooperation directly with each other, for example in the manner of a zip fastener or a sliding closure or the like, or can cooperate with a separate fixing bar in positively locking and/or force-locking relationship.

In accordance with each of the two aspects, also with a combination of the closure and fixing functions, encasing units can be of a cross-section which remains the same in the longitudinal direction. That allows profile-like manufacture in an extrusion process, preferably using soft-elastic or flexurally elastic plastic. The functional region can possibly be separately extruded in that case.

Accordingly in particular also the first and the second fixing strip can be of a cross-section which remains the same in the longitudinal direction, for example with interengaging hook and claw profile or similar suitable configuration, preferably with a barb function.

A functional region serving as a closure can also be manufactured for example by extrusion, if the functional region has two conjugate interengaging closure profiles of plastic which remain the same throughout in the longitudinal direction and which cooperate as a press closure or toothless sliding closure or preferably similarly to a zip closure. In that case each closure profile can include two engagement profiles or profile elements and so-to-speak form a double closure. That is found to be particularly advantageous for a closure which is dust-tight in the peripheral direction and is robust in dynamic operation.

The arrangement may have two laterally mutually opposite functional regions, which each have a respective fixing profile, wherein the fixing profiles are preferably designed for a positively locking connection, for example a tongue-and-groove connection or the like, which is releasable only in the longitudinal direction. Unintentional release of encasing units can be avoided in operation in that way. In that case the laterally opposite functional regions at the same time, besides the fixing profile, also each have a closure profile, in particular arranged in the cross-sectional plane between receiving means and fixing profile.

Preferably adjacent receiving means are connected or coupled together in parallel by intermediate regions in band form, which predetermine the neutral fibre. Alternatively or in addition preferably in relation to each closure comprising cooperating closure profiles the interface is at the level of the neutral fibre of the encasement. The neutral fibre is to extend in particular centrally through the cross-section of the receiving means. In that respect a band-shaped intermediate region which is thinner in comparison with the structural height of the respective fixing strip can be provided between each fixing strip and an adjoining receiving means. In that way it is possible in particular to achieve good flexibility of the direction-changing arc about the desired axis with sufficient stiffness in the transverse direction. Preferably the encasement is designed to be displaceable substantially linearly (not multi-axially).

Clamping devices can be provided on the encasement at the end, which close the encasement and optionally the lines in the axial direction to prevent the discharge of dust particles. In the typical situation of use at least two lines and in most cases a multiplicity of lines are guided separately from each other in a respective receiving means and are enclosed to be as dust-tight as possible by the encasement. No particles are to issue even at the ends.

The invention also concerns an encasing unit as an individual part for the production of an encasement according to one of the preceding embodiments. That encasing unit is produced for example from plastic, in particular soft-elastic or flexurally elastic plastic, and has at least one tubular receiving means for guiding at least one line, which extends channel-like in a longitudinal direction from a first end to a second end. In that case the encasing unit can be considered as a sheath for encasement dust-tightly in the peripheral direction of the line or lines and typically loosely surrounds the lines (in contrast to an actual insulating cable sheath).

According to a particularly advantageous combination of both aspects referred to hereinbefore it is provided that the encasing unit at a longitudinal side includes two co-operating closure profiles which extend in the longitudinal direction for closing an opened state which is in as dust-sealed relationship as possible, in which a line can be introduced into or removed from the receiving means transversely relative to the longitudinal direction and at the other longitudinal side it has a fixing strip which extends in the longitudinal direction for releasable connection to a further encasing unit, in particular by positively locking and/or force-locking engagement, with a corresponding functional region of a further encasing unit. In that respect the encasing unit may form a plurality of pronounced receiving means which in particular are parallel and tubular for separate guidance of at least one respective line or can form respectively precisely one receiving means.

In an embodiment the encasing unit has a first fixing profile at one longitudinal side and a second fixing profile at the other longitudinal side, and the fixing profiles are designed for releasable connection by positively locking connection and/or force-locking connection in mutually matching relationship. That allows a plurality of encasing units with mutually matching fixing profiles or fixing profiles which are of the same structural configuration in pairs to be releasably fixed together. In that case the fixing profiles can in particular be of such a design configuration that they can be connected together in a connecting direction transversely relative to the longitudinal direction.

In particular in the last-mentioned embodiment the closure profiles and fixing profiles have profile elements of identical cross-section, which are compatible or which cooperate for connection with each other.

In regard to fixing profiles of the same structure consideration is to be given in particular to a bar or a profile, wherein the encasing unit can have a bar at a first longitudinal side and a profile at a second longitudinal side and wherein the bar of a first encasing unit can be connected to the profile of a second encasing unit in positively locking relationship and/or by force-locking relationship. In that case the first encasing unit can be in particular of the same structure as the second encasing unit or for example can have a different number of receiving means.

In an embodiment the encasing unit has a first fixing profile at one longitudinal side and a second fixing profile at the other longitudinal side, which are of a complementary or conjugate configuration or which match each other but are different from each other, wherein the fixing profiles are adapted for a releasable connection by positively locking engagement and/or force-locking engagement in mutually matching relationship in order to fix a plurality of structurally identical encasing units releasably to each other.

The proposed encasing unit itself can advantageously have one or more of the features constituting a development thereof. In addition the encasing unit can form a plurality of or precisely one tubular receiving means for separate guidance of at least one respective line or line strand. This embodiment is advantageous if the encasing unit is produced closed in the peripheral direction around the receiving means so that discharge of particles at the location of operation is reliably prevented.

In addition independently of the foregoing an improvement to typical clamping devices for the end connection of a line protective guide for clean rooms is proposed.

A known clamping device includes a first clamping portion and a second clamping portion, wherein at least one clamping portion has an inside recess for receiving an end region of a line protective guide and two respective opposite ends transversely to a through-pass direction corresponding to the longitudinal direction of the line protective guide. The recess opens at least one first end or both ends outwardly. Typically provided in the recess or at the inside is a pressure portion which serves when the clamping device is closed to hold an end region of the line protective guide in force-locking relationship, for example between two oppositely disposed pressure portions.

According to the invention it is now proposed that the pressure portion is of a deformable configuration and projects or protrudes in the through-pass direction beyond the first end of the at least one clamping portion so that the pressure portion forms a corner protection at said end, which provides in particular between the line protective guide and the respective clamping portion for a more advantageous, for example softer transition. In that case the corresponding projection is provided at least at the end which in the travel direction (longitudinal direction of the line protective guide to be received) is towards the remote end region or the other clamping device, and in particular at the side of the line protective guide that corresponds to the interior of the direction-changing arc.

In tests it was established that that region gives off particles to a noticeable extent between the clamping device and the line protective guide, which is attributed to minor relative movements. With the proposed structure it is possible to achieve a noticeable reduction in unwanted particle escape through the line protective guide or the encasement thereof.

Preferably at least one pressure portion is provided in each clamping portion. Irrespective thereof each pressure portion can be produced from a plastic material which is compressible and/or softer in relation to the clamping portions, in particular being soft-elastic or rubber-elastic or hard-elastic.

Suitable pressure portions can be inexpensively produced in the form of extrusion members, in particular hollow-chamber extrusion members.

A further improvement in the transition is achieved if each pressure portion, at least in the non-loaded state, at the inside that faces away from the clamping portion and in the assembled state bears against the line protective guide (in cross-section parallel to the longitudinal or through-pass direction), forms at least one convexly curved or outwardly bulged surface.

Preferably the pressure portions are arranged with their longitudinal extent perpendicularly to the through-pass direction over the entire width of the recess, in particular in one piece throughout.

Each pressure portion can have two rounded narrow sides and can preferably be in the form of a symmetrical profile member.

For easy fitment each pressure portion can have a projecting fixing rib for fixing in a transverse groove in the clamping portions.

In a preferred embodiment received in each receiving means of the at least one clamping portion are two structurally identical pressure portions disposed in mutually juxtaposed relationship, which are arranged parallel and perpendicular to the through-pass direction, preferably at a spacing relative to each other. In that case it can preferably be provided that one pressure portion projects at the one end and the other pressure portion projects at the other end of the associated clamping portion so that an edge-blunting configuration is achieved to the benefit of lines which are passed out of same.

BRIEF DESCRIPTION OF THE DRAWINGS

Further details and features of the invention will be apparent without limitation on the generality of the foregoing from the description hereinafter of preferred embodiments by way of example with reference to the accompanying drawings in which:

FIGS. 18A-18C show various arrangements with support chains.

DETAILED DESCRIPTION

Figure 1A:
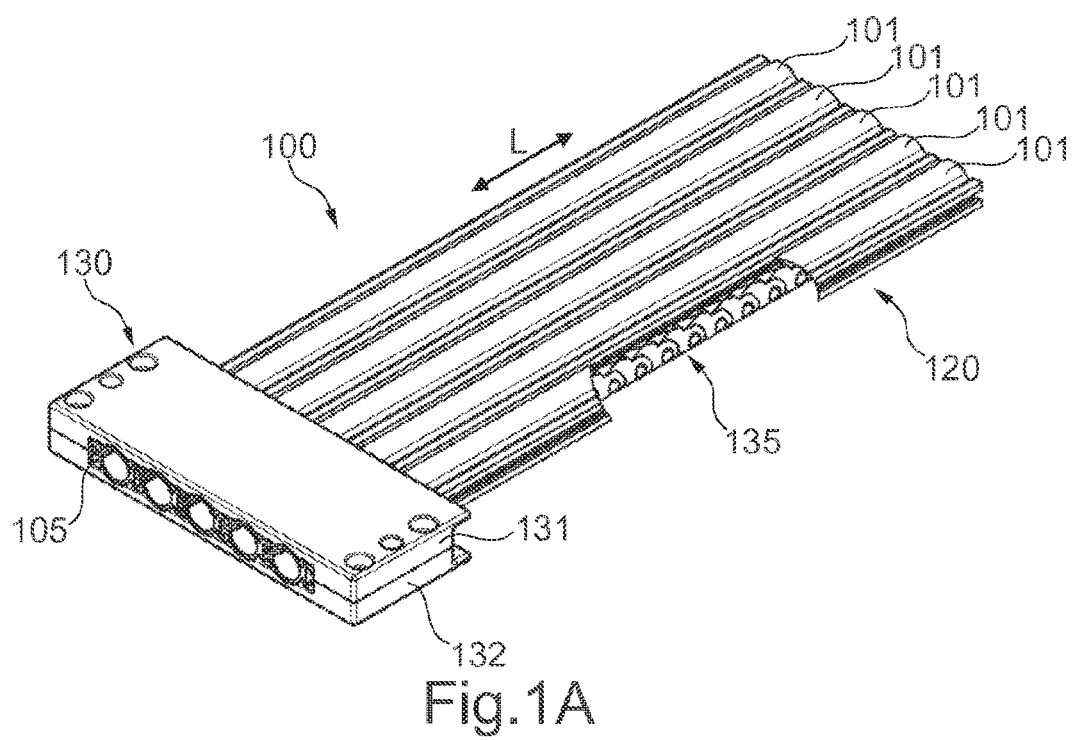
FIGS. 1A-1C show a first embodiment by way of example of a displaceable line protective guide having a flexible encasement, as a partial view of an end region, partly broken-away (FIG. 1A), as a cross-section through individual encasing units (FIG. 1B) and as a front view of an end having an end clamping device (FIG. 1C)
Figure 1B:
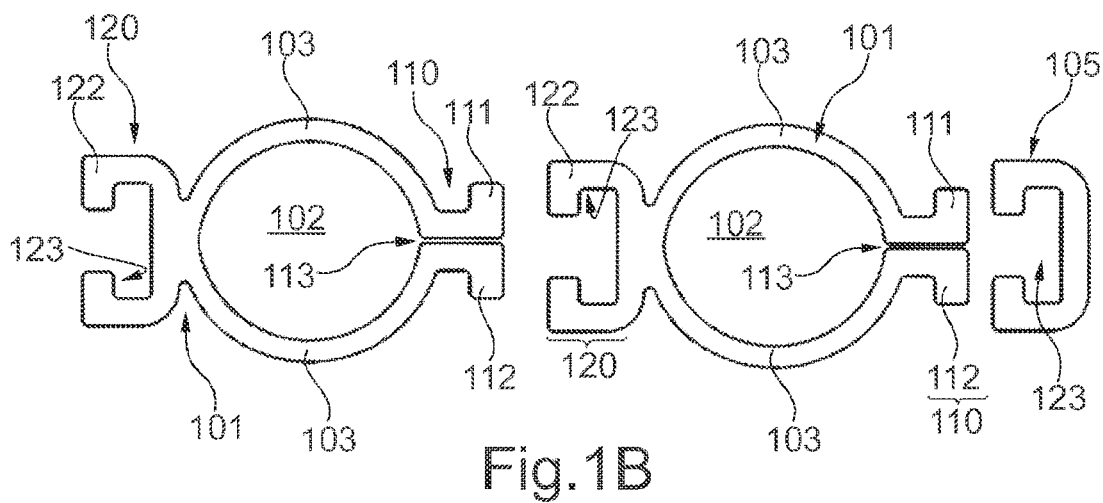
Figure 1C:
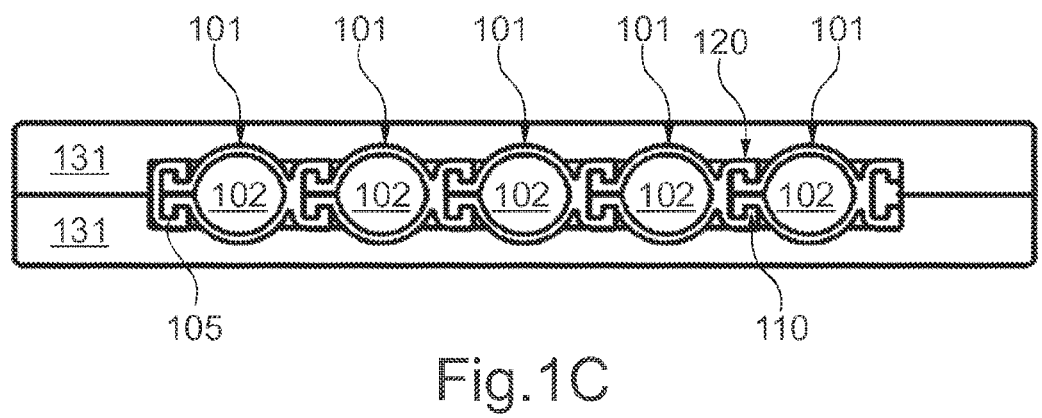

FIGS. 1A-1C diagrammatically show a first embodiment by way of example of a reciprocatingly displaceable line protective guide for lines (not shown). It has an elongate flexible encasement 100 which is composed of a multiplicity of individual encasing units 101 produced from plastic. Each encasing unit 101 is made from a flexible soft-elastic plastic, in particular a thermoplastic, for example PE, PU, TPU, PTFE, expanded PTFE, PP or the like. Each encasing unit 101 over its length is of a cross-section which remains the same throughout (FIG. 1B) perpendicularly to the longitudinal direction L. The encasing unit 101 can be produced for example inexpensively as an extrusion in a suitable plastic extrusion process and can be cut to an appropriate length, for example from about 100 mm to about 1500 mm. The structurally identical encasing units 101 form in the interior thereof a substantially cylindrical receiving means 102 for protective guidance of a line and for that purpose are of a tubular configuration with wall regions 103 which are of thin gauge in relation to the cross-section of the receiving means 102. The receiving means 102 of the flexible encasement 100 are spatially separated from each other so that no abrasion can occur between lines guided in parallel therein.

Each encasing unit 101 at a longitudinal side has a first functional region 110 which in FIGS. 1A-1C comprises two closure profiles 111, 112 which are conjugate in mirror-image symmetry and which are in opposite separate relationship and which in a condition of jointly bearing against each other form a cross-section approximately of a T-shape. Each closure profile 111, 112 is continuous in the longitudinal direction L and here is approximately L-shaped for example in cross-section. As shown here the closure profiles 111, 112 can form L-limbs facing away from each other or L-limbs which are preferably disposed in each other or in juxtaposed relationship in parallel to reduce the height of the closure. Between the closure profiles 111, 112, in particular centrally therebetween, the encasing unit 101 has an interface or an opening 113 which extends in the longitudinal direction L and radially. The opening 113 in gap form of a loose or separate encasing unit 101 (FIG. 1B) can be widened by bending open the encasing unit 101 in order to introduce a line prefabricated with plugs laterally or transversely relative to the longitudinal direction L into the receiving means 102 or to remove it therefrom.

The encasing unit 101, in diametrally opposite relationship to the first functional region 110, has a second functional region 120 comprising a fixing profile 122. The fixing profile 122 is continuous in the longitudinal direction L and for example is of a substantially C-shaped cross-section with an internal contour 123 which is sized in matching relationship with the external contour of the closed closure profiles 111, 112 of the first functional regions 110, in particular with a slight undersize for a positively locking and force-locking connection. By axially pushing the fixing profile 122 on to the closure profiles 111, 112 of an adjacent encasing unit 103 the opening 113 thereof can be closed so as to be at least substantially sealed in relation to particles and can be easily opened again to replace a line. The functional regions 110, 120, here together with the opening 113, by virtue of their longitudinal sectional plane of symmetry, define the neutral fibre of the flexible encasement 100, that is to say the longitudinal central plane, the length of which does not change upon bending or in the direction-changing arc 4 (FIG. 8), that is to say it has no tensile/thrust stress. In addition the additional wall thickness at the functional regions 110, 120 creates a comparatively stable encasement 100 which is displaced in a more controlled fashion without perceptibly adversely affecting the reversible flexibility thereof.

FIGS. 1A and 1C further show one of two end clamping devices 130 with two clamping parts 131, 132, between which all encasing units 101 of the encasement 100 together with lines (not shown) guided therein are dust-tightly closed off at the end and in the axial direction, for example by clamping screws. The clamping devices 130 can at the same time also provide for tensile stress relief of the lines (not shown) and can be of a per se known structural configuration, for example similarly to the teaching of DE 10 2012 100 290 B4 which is here incorporated in that respect.

Figure 8:
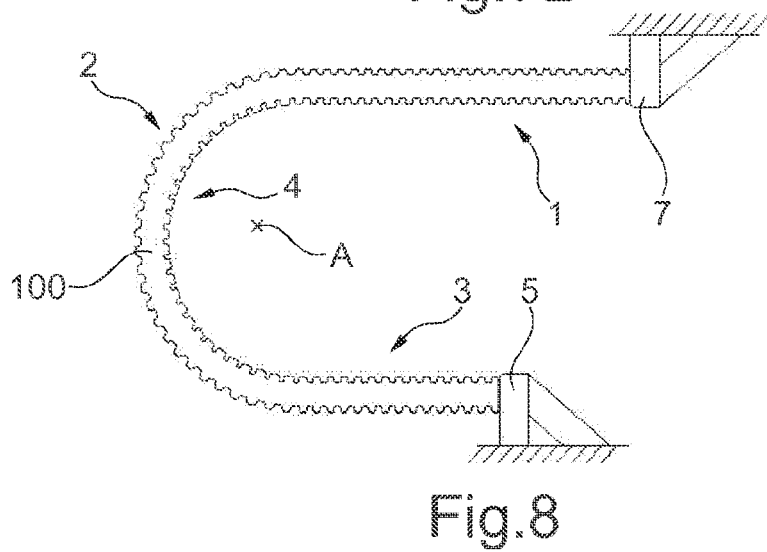
FIG. 8 shows a typical arrangement of a line protective guide or line protective device as a diagrammatic side view.

FIG. 1A shows one of two support chains 135 which is accommodated in the receiving means 102 of the two laterally outer encasing units 101 and comprises individual chain links. Optional support chains 135 on the one hand can predetermine the minimum permissible radius at the direction-changing arc 4 (FIG. 8) to protect the chain from kinking and on the other hand by virtue of abutments for the chain links in the straight position can increase the self-supporting length of the encasement 100 in the moveable run, for example in the upper run 1 (FIG. 8).

As indicated in FIG. 1B the opposite closure profiles 111, 112 are connected in one piece to the wall regions 103 of the encasing unit 101, that are in the nature of a segment of a tube. The fixing profile 122 is also connected in one piece with the upper wall region 103 and the lower wall region 103. In particular the closure profiles 111, 112, as an alternative to an inexpensive production in one piece involving unitary material, can be produced separately from a suitable plastic and connected in material-bonded relationship to wall regions 103 or the encasing units 101 to form a composite material, preferably by plastic welding. The cross-section of the encasing units 101 or wall regions 103, besides the illustrated approximately circular shape, can also be of an elongatedly round or oval shape. The illustrated cross-sectional shapes of the closure profiles 111, 112 and the fixing profile 122 are shown here purely by way of example and can be of a different design, for example predominantly round. The number of parallel-coupled encasing units 101 as shown in FIGS. 1A-1C can be selected as desired to match the number of desired lines or can be subsequently enlarged by virtue of the functional regions 110, 120. The closure profiles 111, 112 can additionally be designed at the inside for opening purposes (not shown here) in the form of a pressure closure, for example in accordance with the Ziploc® principle or the like in order to avoid unwanted widening of the opening 113 after separation of the adjacent encasing unit 101 (see also FIGS. 4A-4D).

FIGS. 1A-1C further show a closure bar 105 with an internal contour corresponding to the fixing profile 122. The closure bar 105 serves (in relation to the discharge of abrasion particles) for sealingly closing the opening 113 or closure profiles 111, 112 disposed at an outside with a laterally outer encasing unit 101, similarly to the fixing profile 122.

FIG. 1C illustrates the completely closed operating state of the encasement 100, in which all fixing profiles 122 are connected in positively locking relationship and/or by force-locking engagement, for example a clamping action, to the opposite closed closure profiles 111, 112 and close the interposed opening 113 dust-tightly and continuously in the longitudinal direction L.

Features involving a structure or function identical to or corresponding to FIG. 1 are denoted by corresponding references in FIGS. 2 to 7 and are possibly not described again.

Figure 2:
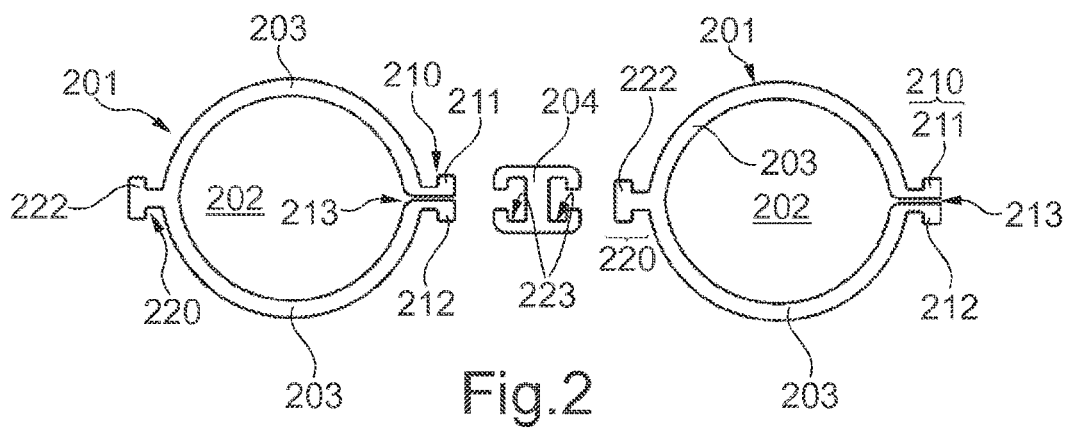
FIG. 2 shows a further embodiment with individual encasing units which are modified in relation to FIGS. 1A-1C as a cross-sectional view (exploded)

FIG. 2 shows a preferred alternative encasing unit 201 having two functional regions 210, 220 for the construction of an encasement (FIGS. 1A-1C). The encasing unit 201 differs from FIGS. 1A-1C in particular by a different cross-sectional shape of the fixing profile 222 in the second functional region 220. The fixing profile 222 in FIG. 2 is of a positive shape or is a male positively locking portion with a cross-section for example of T-shape except for the interface or opening 213 and corresponding to the cross-section of the first functional region 210. Thus the encasing unit 210, in relation to both longitudinal central planes, vertically and horizontally in FIG. 2, is of a substantially symmetrical cross-section, except for the opening 213 at one side. Corresponding symmetry is also desirable for uniform torsion-free flexing in the direction-changing arc 4 (FIG. 8). Alternatively the second functional region 210 could be identical to the first functional region 210, that is to say fully symmetrically with an opening 213 at both sides. In that case the encasing unit 201 would be composed of two structurally identical half-shell portions (not shown) which can be produced for example by injection moulding processes.

In addition the encasing unit 201 permits separation without opening the adjacent encasing unit 201. That is achieved by fixing of adjacent encasing units 201 (FIG. 1C) in each case by means of a separate fixing bar 204. The fixing bar 204 is of a symmetrical cross-section which is uniform throughout, for example of a H-shape or a double C-shape. At both sides the fixing bar 204 has an internal contour 223 matching both functional regions 210, 220, here in the form of a negative shape or a female positively locking portion. The fixing bar 204 can releasably connect two encasing units 201 by positively locking engagement and/or force-locking engagement, as FIG. 2 shows. At the same time the fixing bar 204 together with the functional region 210 serves as a closure for dust-tightly closing the opening 213 between the closure profiles 211, 212. Other cross-sections, in particular of the functional regions 210, 220 and the fixing bar 204, can also suitably embody the principle shown in FIG. 2.

Figure 3A:
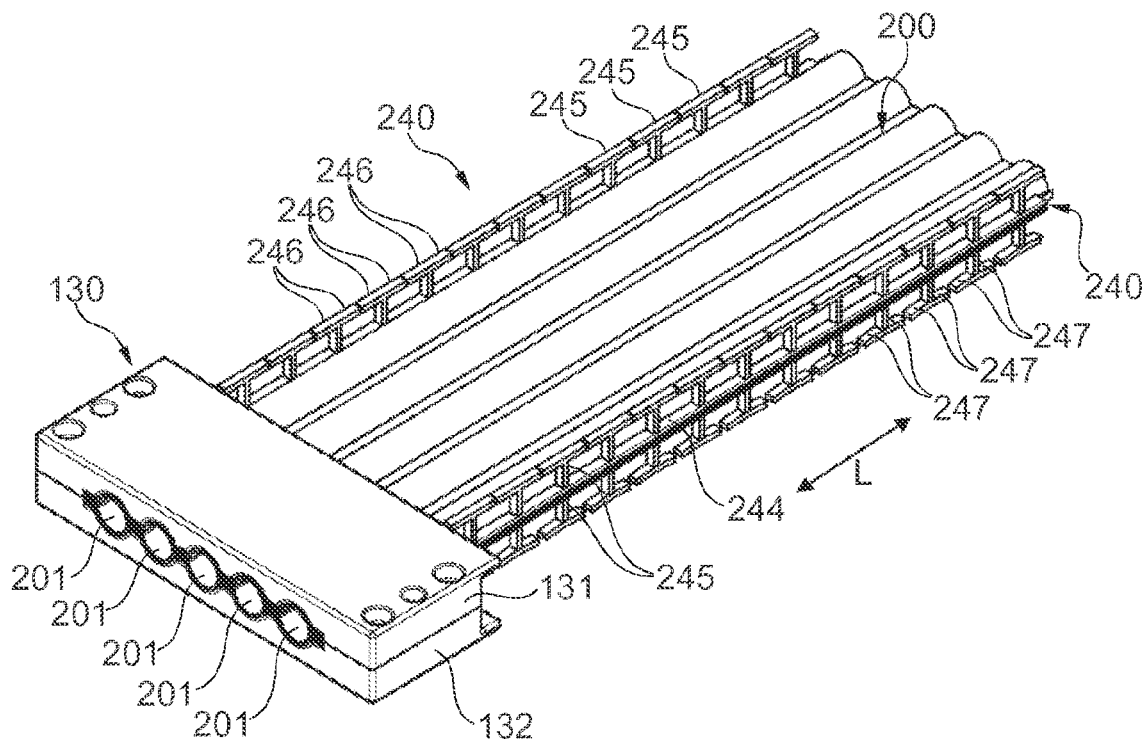
FIGS. 3A-3B show a development with encasing units as shown in FIG. 2 and additional support devices exploded as a cross-sectional view (FIG. 3B) and a perspective partial view of an end region (FIG. 3A)
Figure 3B:
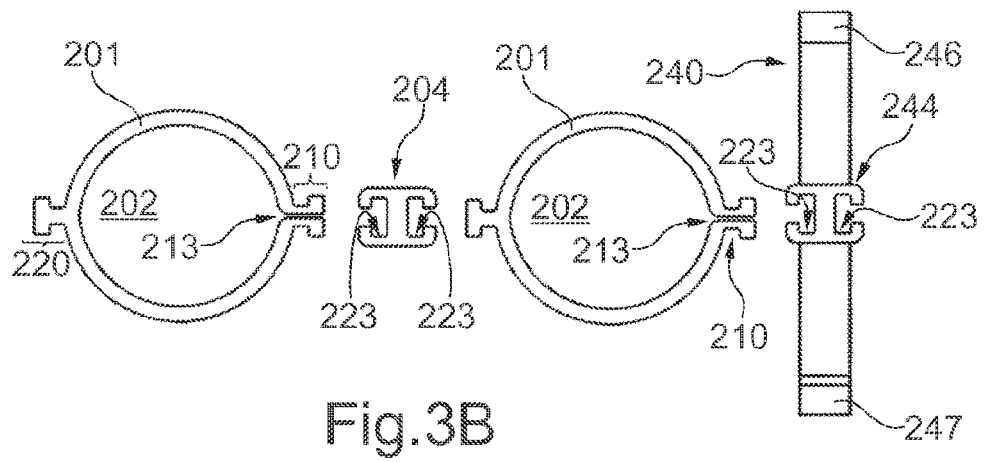

FIGS. 3A-3B show a further advantage of the symmetrical structure of the encasing unit 201 in FIG. 2. It is possible to mount laterally to the outer encasing units 201, that is to say the narrow sides of the encasement 200, a respective structurally identical support device 240 for supporting and definedly guiding the encasing units at the functional regions 210, 220, as shown in FIG. 3B. For that purpose the support device 240 has a carrier band 244 of a cross-section corresponding to the fixing bar 204, that is to say matching the cross-section of the functional regions 210, 220, for example grooves on both sides with an internal contour 223.

The support device 240 is designed to predetermine the radius of the direction-changing arc 4 (see FIG. 8) and to support the self-supporting run 1 in the straight position, or to increase the possible length of the run 1. For that purpose the support device 240, transversely to the longitudinal direction L, has on both sides T-shaped abutment elements 245 which are formed with the carrier band 244 and which are perpendicular thereto, with T-arms 246, 247 disposed in the longitudinal direction L of the encasement 200. The upper/lower or inner/outer T-arms 246, 247 are of different lengths so that the T-arms 247 in the direction-changing arc 4 abut radially inwardly at the desired radius and the T-arms 246 are in abutment in the straight position. The carrier band 244, like the fixing bar 204, is preferably disposed at the level of the neutral fibre of the flexible encasement 200. The fixing bar 204 and the support device 240 are made from flexible, flexurally elastic plastic or plastics. They do not rub against the lines and if required can therefore be of greater flexural strength than the encasing units 201, for example to maintain a radius in the direction-changing arc 4 or to increase the self-supporting run length. Further details relating to the configuration of the support device 240 can correspond to the teaching of WO 2008/125087 A1, except for the configuration of the carrier band 244.

In FIGS. 1 and 2 each encasing unit 101, 201 respectively forms precisely one receiving meas 102, 202 for one or possibly a plurality of lines. FIGS. 4 to 6 show embodiments in which the encasement 101 respectively has a one-piece encasing unit 401, 601 with subdivisions for forming a plurality of parallel receiving means 402, 602 in the same encasing unit 401, 601.

Figure 4A:
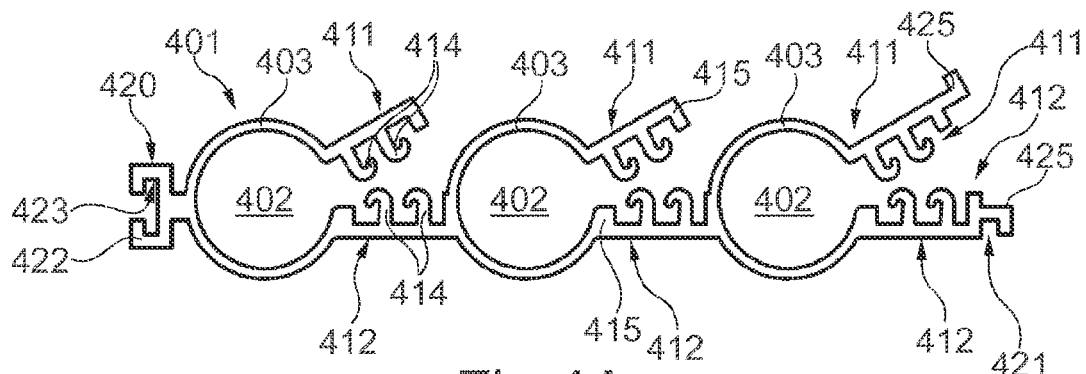
FIGS. 4A-4D show a further embodiment with a one-piece encasing unit subdivided to form a plurality of line receiving means, in the opened state in cross-section (FIG. 4A) and as a perspective view (FIG. 4B) and closed as a cross-section (FIG. 4C) and as a perspective view with an end clamping device (FIG. 4D)
Figures 4B, 4D:
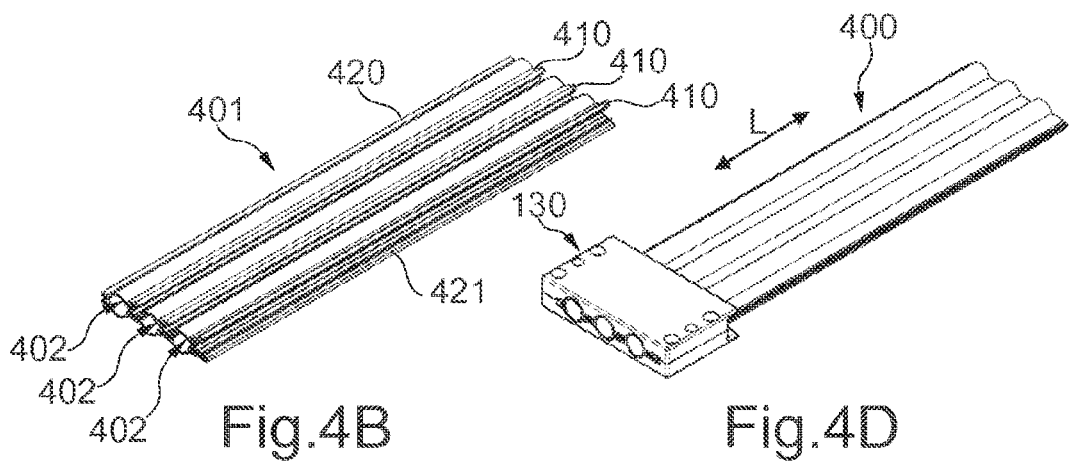
Figure 4C:
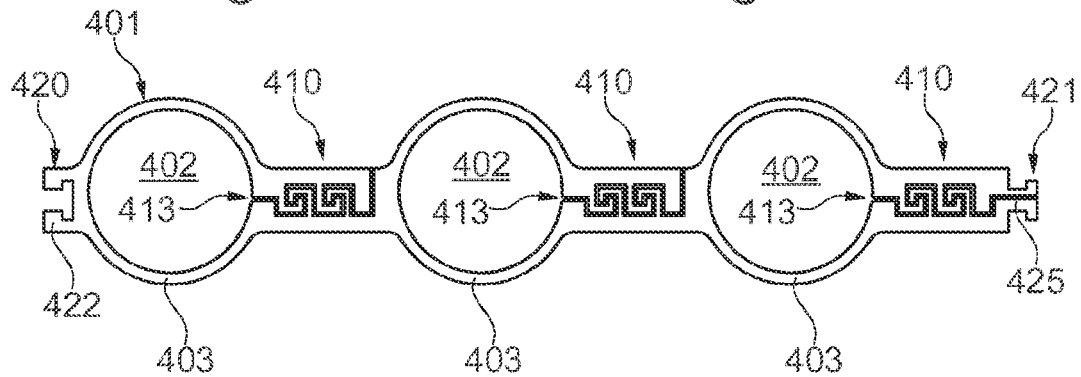
Figure 5:
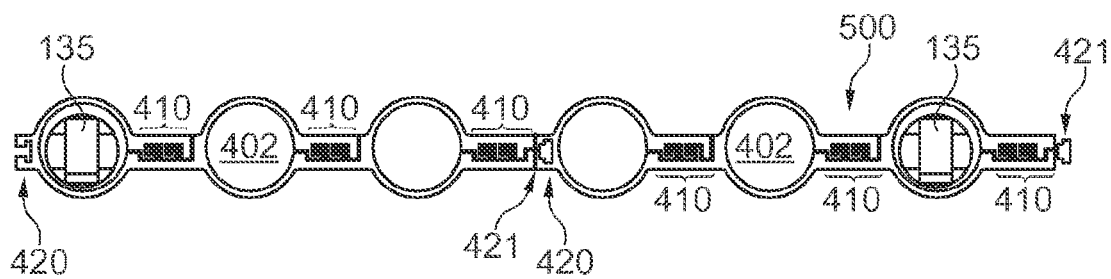
FIG. 5 shows an example of use with an embodiment as shown in FIGS. 4A-4D with two subdivided encasing units which are coupled together in parallel and outward support chains as a cross-section.
Figure 6:
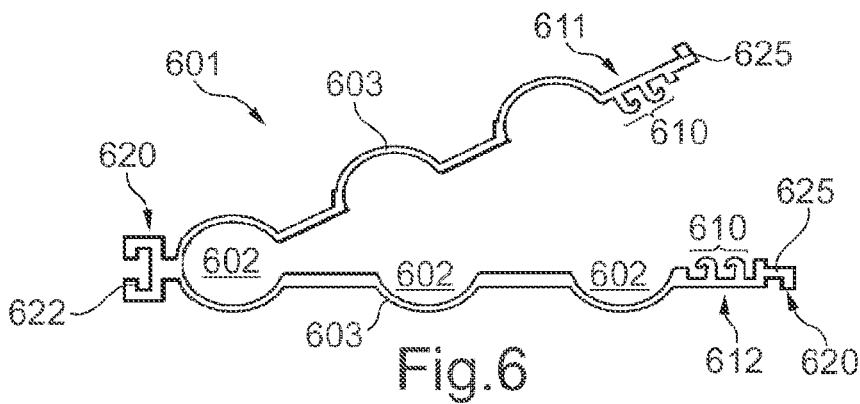
FIG. 6 shows a cross-section of a further embodiment with a closure which is modified in relation to FIGS. 4-5, FIGS. 7A-7B show a further embodiment with individual peripherally closed encasing units which are releasably connected together by lateral fixing profiles.

FIGS. 4-5 show an alternative one-piece encasing unit 401 having for example three parallel receiving means 402 which can be respectively individually opened (FIG. 4A)

and closed (FIG. 4C) to replace or introduce lines. The encasing unit 401 is designed in one piece in the form of a flexible plastic profile with a cross-section which remains the same throughout in the longitudinal direction L, as shown in FIG. 4. It can be manufactured for example from one piece by extrusion. Advantages in respect of manufacturing technology and in relation to material can be achieved if the functional regions, in particular closure profiles 411, 412 are produced separately and possibly from particularly suitable different plastic and are subsequently joined in one piece to the wall regions. It is also possible to envisage a multi-component manufacturing process.

At the narrow sides the encasing unit 401 has two functional regions 420, 421 which are in opposite relationship at both sides and with which adjacent encasing units 401 can be connected to each other in parallel, as shown in FIG. 5. The functional regions 420, 421 in FIGS. 4-5 have fixing profiles 422, 425 which are in one piece with the encasing unit and which are adapted for positively locking and force-locking relationship with a cross-section interengaging in conjugate fashion, for example similarly to FIG. 1. The fixing profile 425 at the side to be opened is designed in two parts with an intermediate interface, for example similarly to the functional region 110 in FIGS. 1A-1C, with an external contour matching the internal contour 423 of the fixing profile 422. Alternatively fixing by means of separate fixing bars, similarly to FIGS. 2-3, is also possible.

As FIG. 4A shows in greater detail at one side of each of the plurality of receiving means 402 of the same encasing unit 401 a respective functional region 410 is connected in one piece to the encasing unit 403 with an oppositely disposed pair of cooperating closure profiles 411, 412. The closure profiles 411, 412 also extend in the longitudinal direction L with a uniform cross-section and serve for sealingly closing (in relation to particle size) the respectively associated receiving means 402 (FIG. 4C). The closure profiles 411, 412 can be in the form of a closure bar including at least profile elements 414 which engage into each other in positively locking relationship, for example with a barb shape in cross-section, on the principle of a suitable pressure closure, or the like. Support regions 415 serve for positively locking latching of the profile elements 414 in the closed state (FIG. 4C). By means of associated closure profiles 411, 412 the receiving means 420 can be individually opened and sealingly closed as required. Opening can be effected by bending open the flexible wall region 403. FIGS. 4-5 show a functional region 410 which is in the form of a robust double closure respectively comprising two profile elements 414 at each closure profile 411, 412, for example to exclude unwanted opening in operation. Unwanted opening however can already be avoided if the wide side to be opened of the encasement 400 is disposed radially inwardly in the direction-changing arc 4. The interface of the opening 413 between the closure profiles 411, 412 is arranged at the level of the neutral fibre, see FIG. 4C.

FIG. 5 shows an encasement 500 comprising two encasing units 401 which are fixed to each other releasably and parallel by means of their lateral functional regions 420, 421 or their fixing profiles 422, 425. A respective support chain 135, as described in relation to FIG. 1A, can be arranged in the two laterally outer receiving means 402, for example when a great length if involved.

FIG. 6 shows a variant in relation to FIGS. 4-5 having an encasing unit 601 which has only one closure for all receiving means 602 jointly. For that purpose there is provided only one functional region 610 with cooperating closure profiles 611, 612 at a narrow side. The wall regions 603 are designed to be connected together plate-like at both wide sides of the encasing unit 601. Otherwise the encasing unit 601 corresponds to the encasing unit 401.

Figure 7A:
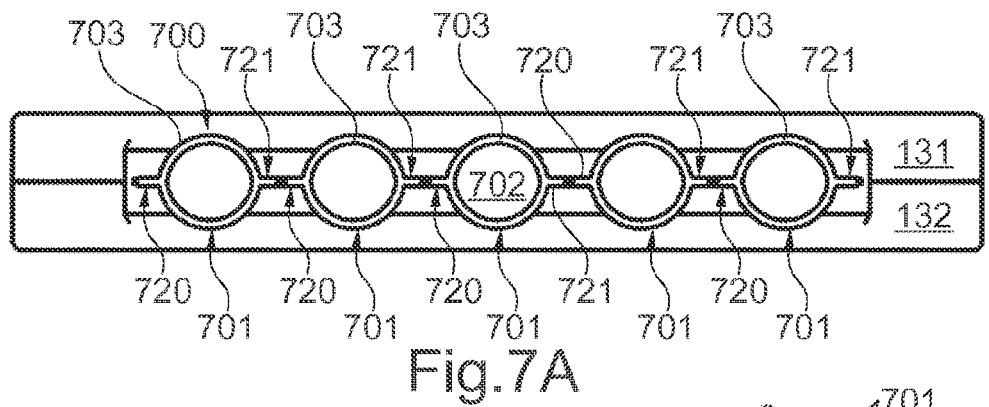
Figure 7B:
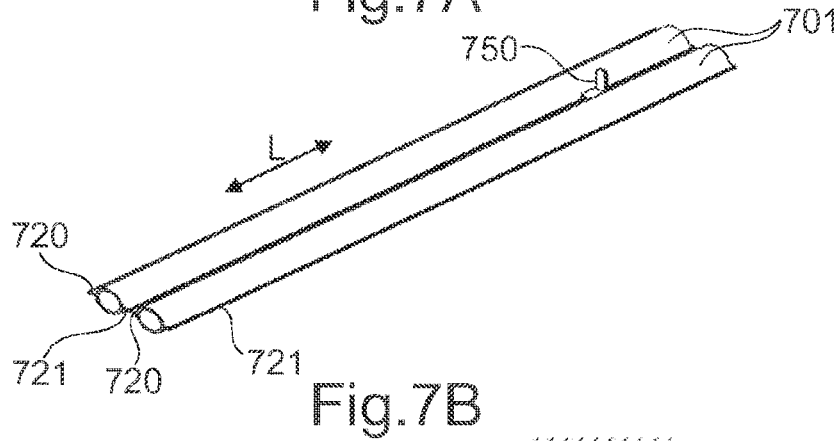

FIGS. 7A-7B show a further preferred embodiment of an encasement 700 which is made up of a multiplicity of individual, structurally identical encasing units 701 which respectively form precisely one receiving means 702. In contrast to FIGS. 1-6 the encasing units 701 are closed in the longitudinal direction L and in the peripheral direction, that is to say with an encasing wall 703 which extends without interruption around the receiving means 702. The wall 703 is for example in the form of a tube or a hose or the like of approximately oval or round cross-section. The encasing units 701 are at least predominantly made from flexible, permanently elastically bendable plastic.

The encasing units 701 cannot be non-destructively opened, that is to say lines have to be passed therethrough axially or in the longitudinal direction, unlike FIGS. 1-6. Unwanted discharge of particles during maintenance operations can be avoided in that way. A simplification in maintenance and expandability is achieved with the encasing units 101 without a closure function at the receiving means 702 solely by the concept of the fixing function or only functional regions 720, 721 cooperating for parallel fixing of individual encasing units 701.

Each encasing unit 701 as shown in FIGS. 7A-7B has functional regions 720, 721 which are produced at both sides in diametrally opposite relationship with the closed encasing wall 703 or subsequently connected thereto and extended in the longitudinal direction L. The functional regions 720, 721 respectively have as the fixing strip a fixing profile or a fixing bar for releasable connection by positively locking engagement and/or force-locking engagement. The functional regions 720, 721 are adapted to cooperate, for release or fitment of an encasing unit 701 from or to an adjoining encasing unit 701 as required. FIG. 7B shows by way of example two connected encasing units 701. It is possible for example to use fixing profiles as functional regions 720, 721, which are of a uniform cross-section in the longitudinal direction to permit extrusion. The functional regions 720, 721 here too extend in strip form in a plane in opposite relationship at two sides along the wall 103. The fixing strips of the functional regions 720, 721 can be in the manner of a toothed zip closure, a toothless sliding closure or the like. The functional regions 720, 721 cooperate for fixing purposes, possibly also with a separate fixing bar as in FIG. 2, which connects the fixing profiles or fixing bar. FIG. 7B diagrammatically shows a closure slider 750 for connecting/separating functional regions 720, 721 which, for fixing the encasing units 701, purely by way of example, are for example in the form of positively locking toothless sliding closures. The functional regions 720, 721 can be produced separately, for example by extrusion or injection moulding, and can be integrally connected to the remaining profile of the encasing units 701, for example they can be welded in place continuously in the longitudinal direction using a suitable procedure. Preferably for that purpose the encasing wall 703 and the functional regions 720, 721 are made from a thermoplastic material.

Adjacent guide channels or receiving means 102 . . . 902 are accordingly fixed to each other by band-like intermediate regions which have a functional region at least at some receiving means 102 . . . 902 that simplifies maintenance and/or facilitates a subsequent modification in the encasement.

The flexurally elastic encasing units 101 . . . 901 can be produced in a unitary material from only one plastic material, in particular in a multi-part configuration comprising separate regions which are then connected in material-bonded relationship, in particular being welded together. The encasing units 101 ... 901 can possibly be produced in a multi-layer structure or with a coating, for example with an external special plastic for reducing friction at the wide sides.

FIG. 8 diagrammatically shows a configuration of a dynamic line guide with dust-tight encasement 100, for example as shown in one of FIGS. 1 to 7, forming a moveable upper run 1 and a stationary lower run 3. Between them the encasement 100 forms a direction-changing arc 4 with a predetermined bending radius about a notional axis A. The direction-changing arc 4 travels over a distance relative to a stationary connection 5 when the upper run 1 is displaced with the moveable connection 7. Any position in space however can be involved here, and the encasement 100 can also move vertically or laterally. The two ends of the encasement 100 are dust-tightly closed, for example with clamping devices as shown in FIG. 1A. The encasement 100 is overall of a hose-like configuration and is sufficiently flexible, inter alia by virtue of being of a suitable configuration and/or by a suitable choice of material, to allow reversible flexible curvature of the direction-changing arc 4 with a small amount of applied force, and to follow the travel movement of the moveable connection 7 with the lowest possible level of resistance.

FIGS. 9A-9D diagrammatically shows an encasement 900 which is made up of a multiplicity of individual encasing units 901. The encasing units 901 each form one or more receiving means 902. In contrast to FIGS. 1-6 the encasing units 901 are closed in the longitudinal direction L and in the peripheral direction, that is to say, being designed with an encasing wall 903 which extends without interruption around the one or more receiving means 902. The wall 903 is for example in the form of a tube, a hose or the like, with an approximately lens-shaped or ogival (or vesica piscis/double-pointed oval) or also oval or round in cross-section. Preferably the lens-shaped cross-section shown in FIGS. 9A-9D is used to provide the receiving means 902. That can be formed in particular from two identical segments of a circle which are assembled at their chords symmetrically relative to the neutral fibre. That cross-sectional shape reduces fold formation, that is to say abrasion in the direction-changing arc. The encasing units 901 are at least predominantly made from flexible, permanently elastic, bendable plastic, in particular being extruded, for example from expanded PTFE.

Encasing units 901 as shown in FIGS. 9A-9D cannot be non-destructively opened, that is to say lines have to be passed through same axially or in the longitudinal direction, unlike FIGS. 1-6. Unwanted discharge of particles during maintenance operations can thereby be reliably avoided. A simplification in maintenance and expandability is achieved with the encasing units 901 without a closure function at the receiving means 902, solely by the concept of the fixing function or the functional regions 920, 921 which cooperate for parallel fixing of individual encasing units 901. In that case each encasing unit 901 can for example have an interrelated line strand in order to renew a line strand prefabricated with plugs or the like independently of a differing line strand, by means of replacement of an encasing unit 901.

Each encasing unit 901 as shown in FIGS. 9A-9D has functional regions 920, 921 which are disposed in diametrally opposite relationship on both sides and which are either produced in one piece with the closed wall 903 or are subsequently connected thereto and which extend continuously in the longitudinal direction L. The functional regions 920, 921 each have as a fixing strip a fixing profile and/or a fixing bar for a releasable connection by positively locking and/or force-locking engagement. The functional regions 920, 921 are adapted to cooperate for detaching or fitting an encasing unit 901 as required to or from an adjoining encasing unit 901. A suitable structure is described hereinafter with reference to FIGS. 10A-10D.

Figure 9A:
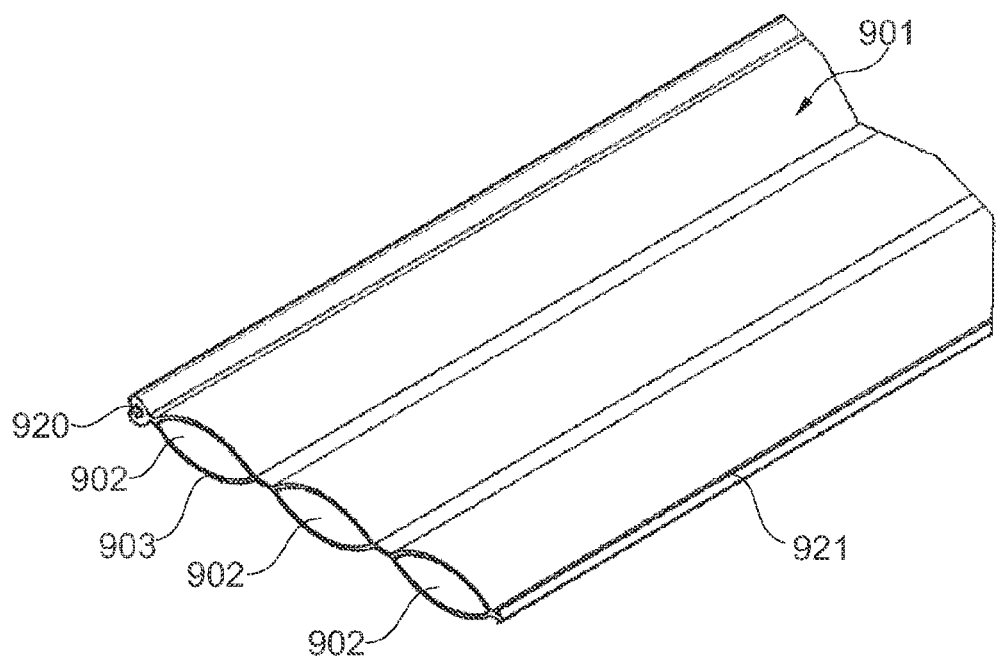
FIGS. 9A-9D show an example which is not claimed according to the invention with encasing units connected together releasably by lateral fixing profiles.
Figure 9B:
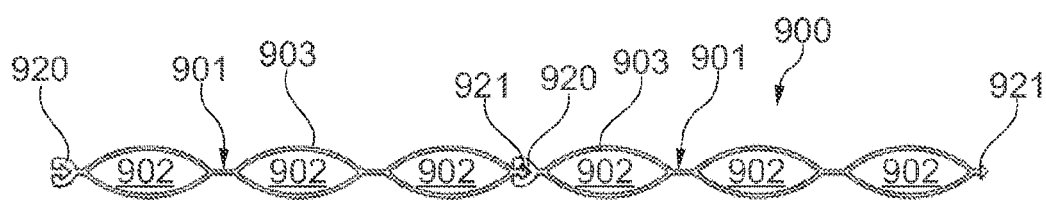
Figure 9C:
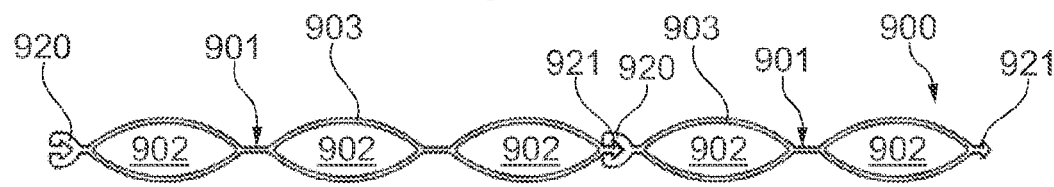
Figure 9D:
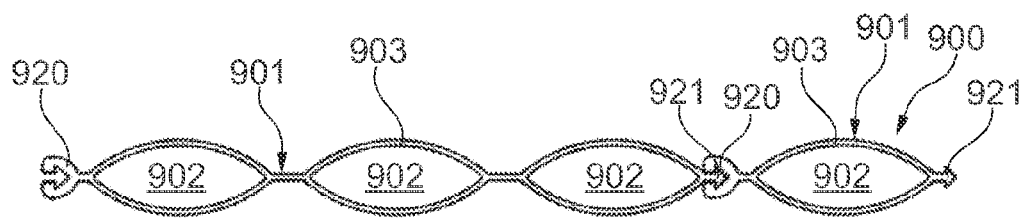

FIGS. 9B-9D show by way of example two connected encasing units 901, a first encasing unit 901 forming three receiving means 902. In FIG. 9B a second encasing unit 901 also has three receiving means 902. In FIG. 9C the second encasing unit 901 has two receiving means 902 while in FIG. 9D there is one receiving means 902. A different number of receiving means 902 which are formed by an encasing unit 901 permits adaptation of an encasing unit 901 to a line strand (not shown), in particular to the number of lines (not shown) within a line strand (not shown). Thus a configuration according to requirements of encasing units 901 with an adapted number of receiving means 902 within an encasement 900 makes it possible for an individual line strand (not shown) to be replaced as required by the replacement of an encasing unit 901.

It is possible to use for example fixing profiles as functional regions 920, 921, which are of a uniform cross-section in the longitudinal direction L, to permit extrusion. The functional regions 920, 921 here too extend in strip form in a plane in opposite relationship at two sides along the encasing wall 903. The fixing strips of the functional regions 920, 921 are designed in the manner of a closure with interengaging fixing profiles, similar for example to press-closure bags or preferably zip-closure bags. The functional regions 920, 921 here cooperate for fixing purposes, possibly also with a separate fixing bar as in FIG. 7 which connects the fixing profiles or fixing bar.

Preferably the functional regions 920, 921 are produced in one piece with the walls 903 by extrusion, either using a unitary material or from different plastics, for example with a flexible but stronger or harder plastic for the functional regions 920, 921. The functional regions 920, 921 can be produced separately, for example by extrusion or injection moulding, and can be integrally connected to the remaining profile of the encasing unit, for example being welded continuously in the longitudinal direction by a suitable procedure. Preferably for that purpose the wall 903 and the functional regions 920, 921 are made from a thermoplastic material.

Figure 10A:
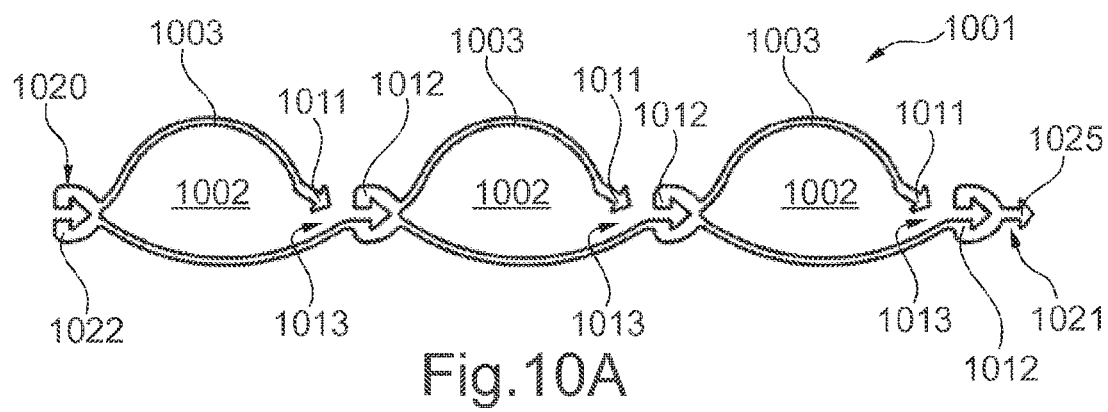
FIGS. 10A-10D show a further embodiment of the invention with an encasing unit having a plurality of receiving means which can be individually filled and preferred cross-sections of associated functional regions.
Figures 10B, 10C, 10D:
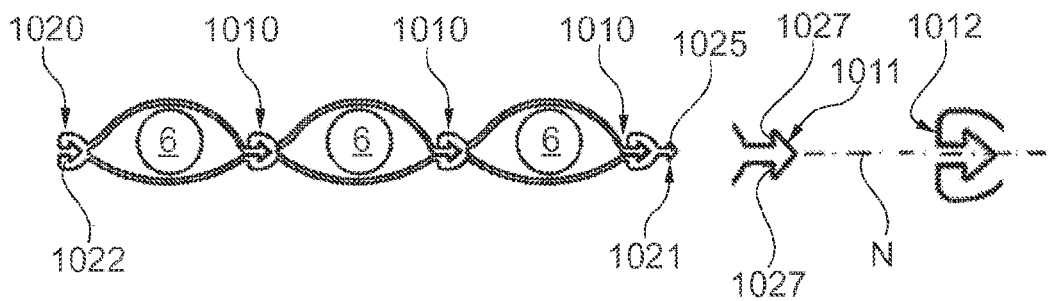

FIGS. 10A-10D show a particularly preferred further example of an encasing unit 1001 representing a variant of the principle shown in FIGS. 4A-4D. In this case also the encasing unit 1001 is made from flexible bendable plastic, preferably by extrusion, and has a plurality of, for example three, receiving means 1002 for lines 6 in the closed state (FIG. 10B). In that case the encasing unit 1001 for each receiving means 1002 has a respective dedicated or associated functional region 1010 which is in the form of a closure, here in particular in the form of a strip-like closure bar with two engagement profiles or closure profiles which engage into each other in conjugate relationship, more specifically a hook profile 1011 which can engage into a claw profile 1012. The hook profile 1011 and the claw profile 1012 are each provided with at least one undercut configuration, preferably two symmetrical undercut configurations, and engage into each other with a barb-like function, that is to say they are relatively easy to close or connect but are to be released only with the application of a markedly greater force.

In addition at both opposite narrow sides the encasing unit 1001 also has a respective functional region 1020 and 1021 which serves for modular fixing of a plurality of encasing units 1001 with correspondingly structurally identical functional regions 1020 and 1021 in a position laterally in mutually juxtaposed relationship or at a support device (see FIG. 3A). The fixing strips or bands 1020, 1021 are here also in the form of a claw profile 1022 and a hook profile 1025 respectively, similarly or identical to the closure functional regions 1010.

FIGS. 10C-10D show diagrammatic enlarged cross-sectional views of the hook profile 1011 and the claw profile 1012 which being of identical structure can also be used for the closure functional regions 1020 and 1021 respectively. The hook profile 1011 and the claw profile 1012 are of a cross-section which remains the same throughout in the longitudinal direction (perpendicular to the plane of FIGS. 10C-10D) and are in the form of flexible strips or bands which are bendable about the axis A in the direction-changing arc 4 (FIG. 4). The hook profile 1011 is in the form of a symmetrical double-hook profile with respect to the neutral fibre N, for example as shown here of an arrowhead shape, a mushroom shape or the like and has respective correspondingly rear undercut configurations or undercut portions. The rear sides 1027 can extend rearwardly inclinedly at an angle with respect to the plane of symmetry and the connecting direction in order to enhance the action as a barb and to reliably prevent unwanted detachment. The claw profile 1012 is of corresponding cross-section symmetrically with respect to the neutral fibre N. The claw profile 1012 has an inner receiving means in matching or conjugate relationship with the hook profile 1011 with a matching cross-section and undercut configurations, wherein the receiving means can be designed with an undersize to achieve a force-locking connection. Around that receiving means the claw profile 1012 forms two claw-like bars or strips which engage behind the hook profile 1011 like a jaw and hold it fast. Other forms of a hook profile 1011 and a claw profile 1012 can also be considered, in particular as in the case of toothless zip fasteners, in particular ziplock, sliding or press closures made of plastic. The foregoing configuration can be appropriately used for the fixing functional regions 1020, 1021. Zip fasteners 1010 or 1020, 1021 with interengaging parts which are of a substantially uniform cross-section over their entire length and which are operated without a slider as that structure can be easily implemented using an extrusion process are preferred. It is also possible to provide a suitable slider as a tool or an aid for opening or closing purposes.

An arrangement of the closure functional regions 1010 and fixing functional regions 1020 and 1021 at the level of the neutral fibre N as in FIGS. 10A-10D is particularly advantageous. The neutral fibre N, also referred to as the zero line, is the layer in the cross-section whose length does not change upon bending, in particular upon displacement of the direction-changing arc 4 (FIG. 8), that is to say the layer involving a constant dimension in the longitudinal direction upon curvature.

As is particularly clearly visible from FIGS. 10C-10D the fixing functional regions 1020 and 1021 can be relatively easily connected together in a connecting direction V which is perpendicular to the longitudinal direction L, wherein the connecting direction V can be substantially in the plane of the neutral fibre N. The fixing functional regions 1020 and 1021 however can only be detached with very great difficulty in opposite relationship to the direction V so that unwanted release does not occur in operation.

The closure functional regions 1010 and fixing functional regions 1020 and 1021 can be produced with a unitary material with the walls of the receiving means 1002 or can be produced from a comparatively more flexurally stiff plastic, for example using an extrusion process, for example to increase the stability of the connections and the encasing unit 1001 overall.

Figure 11:
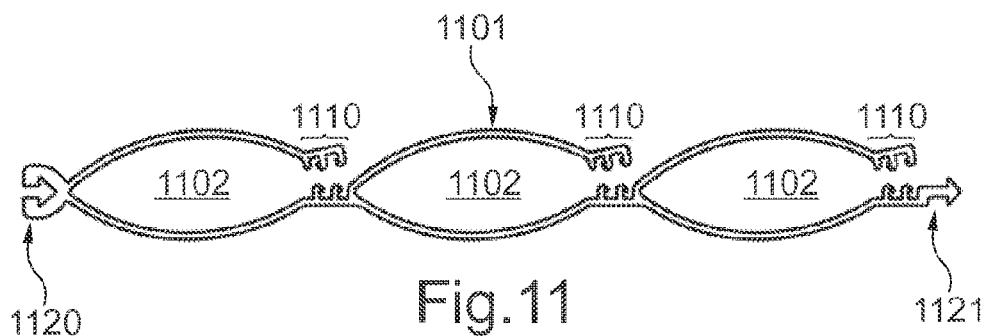
FIGS. 11-12 show further embodiments as variants in relation to FIGS. 10A-10D, FIGS. 13A-13E show a preferred embodiment of an end fixing device with clamping portions for a line protective guide with flexible encasement according to a further independent part of the present disclosure.

FIG. 11 shows a modification with an encasing unit 1101 in which the fixing functional regions 1120 and 1121 are designed in accordance with the principle shown in FIGS. 10A-10D. The closure functional regions 1110 in contrast are in the form of double hook engagement profiles based on the principle of FIGS. 4A-4C. It is to be noted here that the view in FIGS. 4A-4C is not true to scale as the closure functional regions 410 are shown there on a greatly enlarged scale. Typically the functional regions 1010, 1020 or 1021 or 1110, 1120 and 1121 are of a structural height in cross-section in the millimetre range, for example from about 1 mm to about 3 mm.

Figure 12:
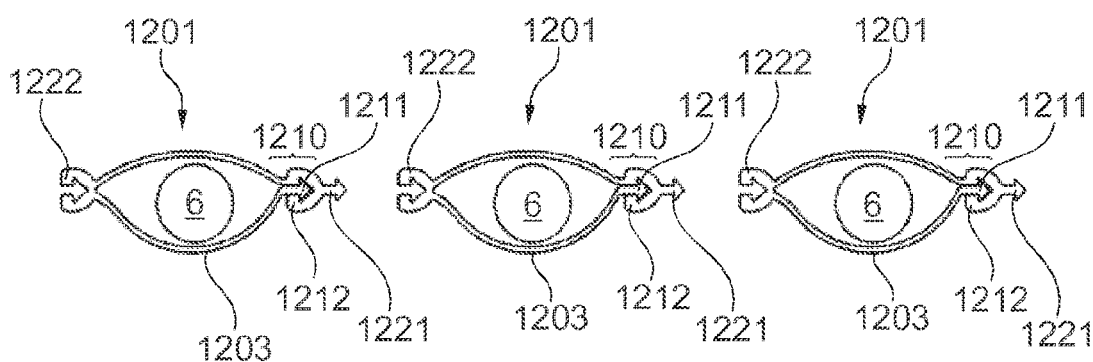

FIG. 12 again shows a modification over FIGS. 10A-10D with the essential difference that each encasing unit 1201 in FIG. 12 forms precisely one receiving means which can be individually opened and closed. Besides a corresponding closure functional region 1210 with a hook profile 1211 and a claw profile 1212 similarly to FIGS. 10A-10D at each receiving means in FIG. 12 each individual receiving means also has at both sides at each narrow side its own fixing profile, for example a claw profile 1222 or a hook profile 1212.

Figure 13A:
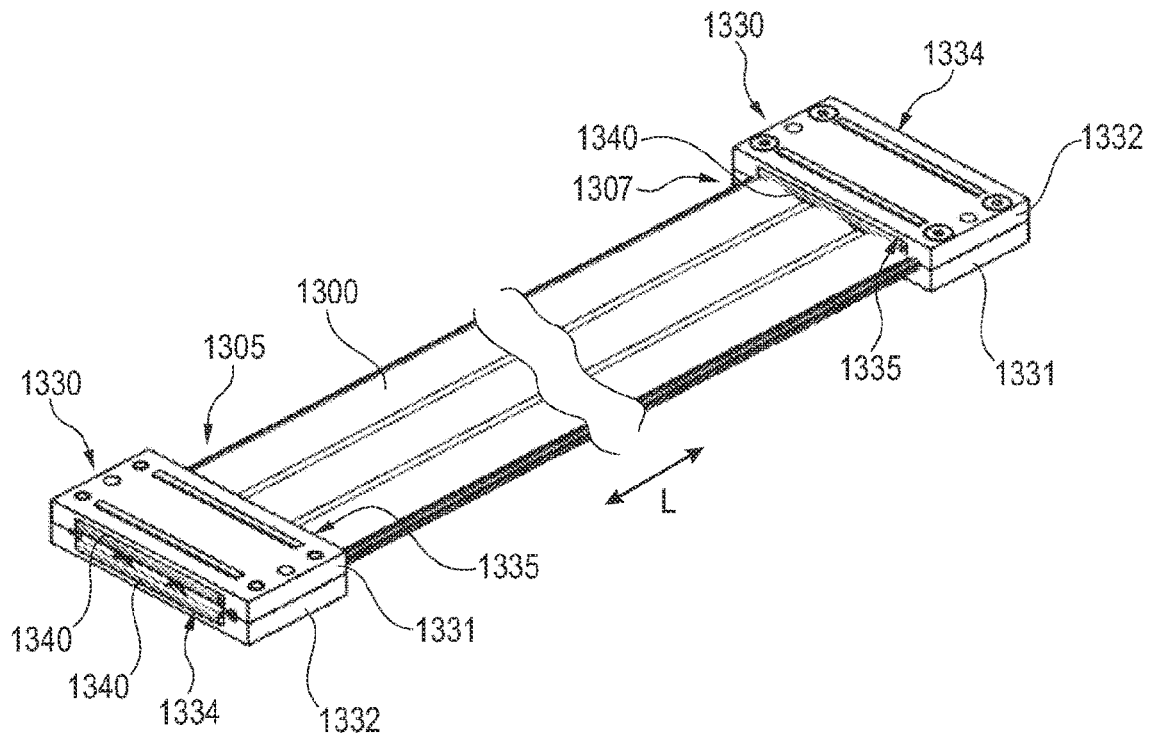
Figure 13B:
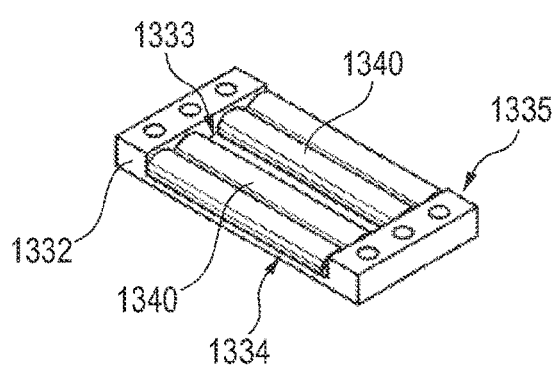
Figure 13C:
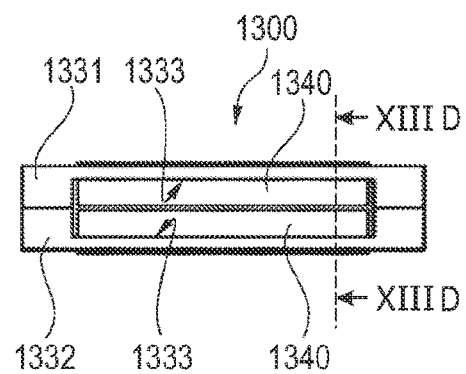
Figure 13D:
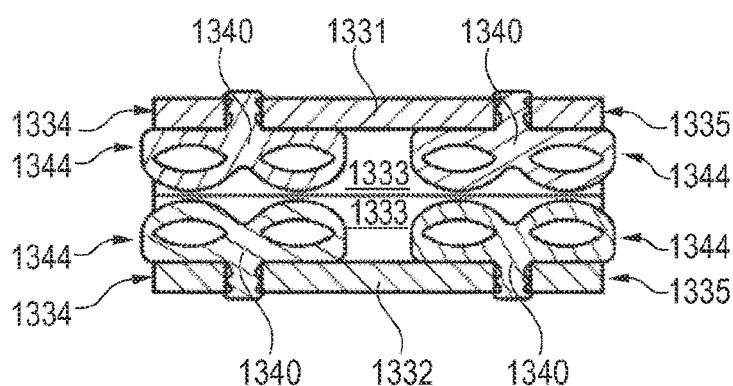
Figure 13E:
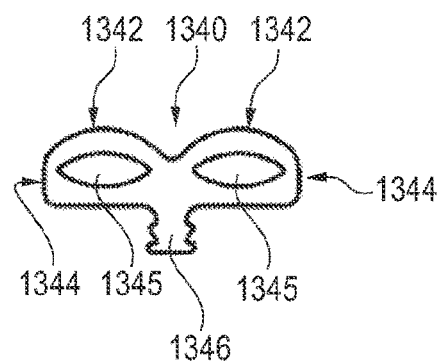
Figure 14:
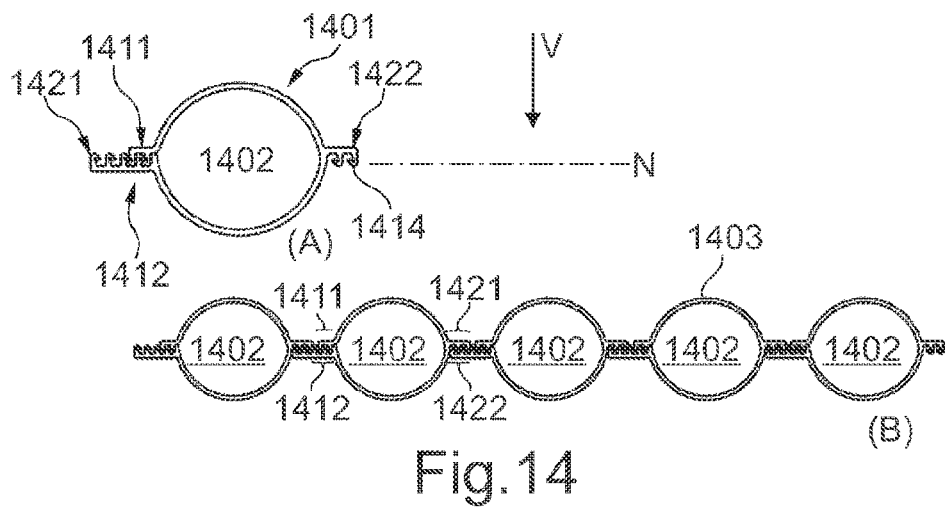
FIGS. 14-16 show further embodiments of encasing units.

FIG. 14 shows a development with encasements 1402 each with only one receiving means 1402 in which closure profiles 1411, 1412 are provided as closure bars, each having two cooperating profile elements 1414 which engage into each other in positively locking relationship. Those profile elements 1414 are for example of a cross-section in barb form, in accordance with the principle of a suitable press closure or the like, similarly to FIG. 4A and FIG. 6 respectively. By virtue of associated closure profiles 1411, 1412 the receiving means 1402 can here too be individually opened as required and dust-tightly closed for replacement of a line or support chain. The closure profiles 1411, 1412 have a doubled toothed bar each having two interengaging parallel hook bars or profile elements 1414 for a secure fixed connection in the closed state of the receiving means 1402 (FIG. 14B). In addition each encasement 1401 has two cooperating fixing strips or profiles 1421, 1422, arranged laterally beside the closure profiles 1411, 1412 and also extending continuously in the longitudinal direction with a uniform profile. In this case the fixing profiles 1421, 1422 are of the same structural shape or the same cross-section as the closure profiles 1411, 1412. In the example of FIGS. 14A-14B the encasing wall 1403 can be bent open after opening of the closure profiles 1411, 1412. Independently thereof individual encasements 1401 can be connected together or released from each other by way of the fixing profiles 1421, 1422. As a deviation from FIGS. 9-10 and FIG. 13 the connecting direction V of the fixing profiles 1421, 1422 is here however not disposed in the neutral fibre but is directed perpendicularly to the neutral fibre N, and here too is in the plane perpendicularly to the longitudinal direction, as FIG. 14B shows.

Figure 15:
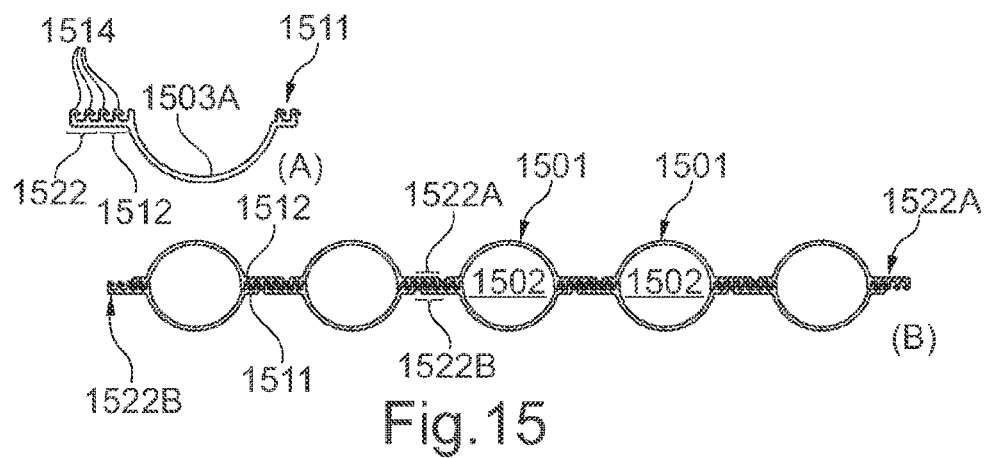

As a variant from FIG. 14 FIG. 15 shows a structural configuration which is comparable in the fitted state and in which each encasement 1501 is composed of two half-shell portions 1503A which each have two closure profiles 1511, 1512 and only one fixing profile 1521. Two connected half-shell portions 1503A, as shown in FIG. 15B, are however again coupled or connected to each other by way of two respective lateral, functionally separate fixing strips 1521A, 1521B.

Figure 16:
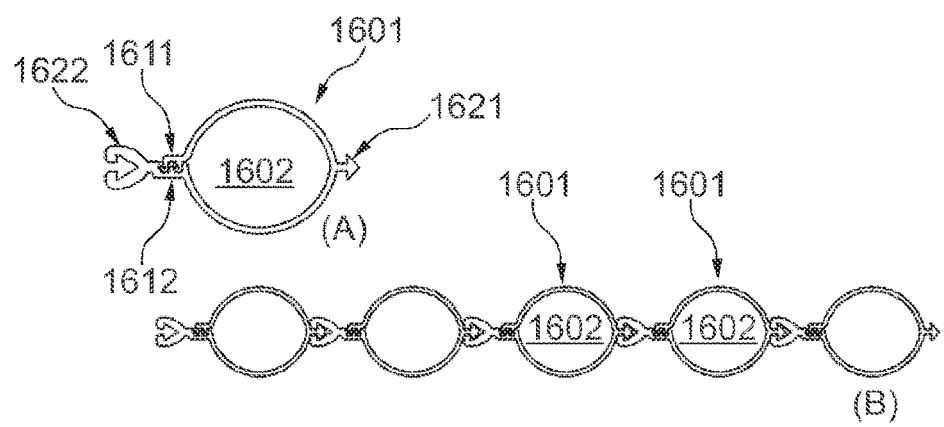

In the variant shown in FIG. 16 the closure profiles 1611, 1612 correspond to those in FIGS. 14-15 or FIG. 4 or FIG. 6, whereas the fixing strips 1621, 1622 have the hook and claw profile of FIG. 9 and FIGS. 10C-10D, which can be fitted together in the connecting direction.

Figure 17:
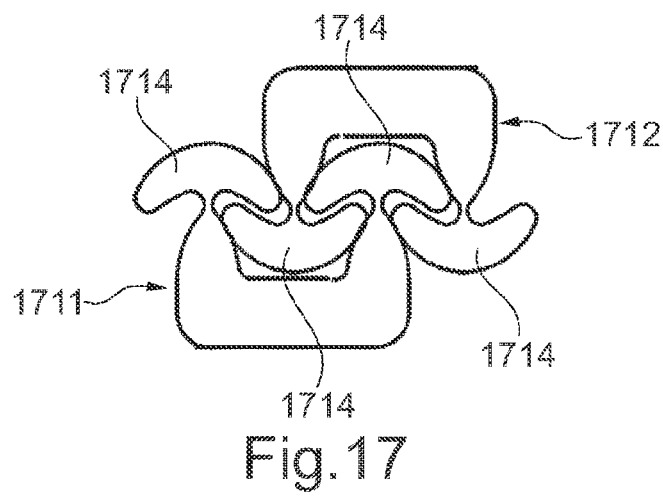
FIG. 17 shows a modification of a functional region as a closure or fixing.

As a possible development, in particular of the closure profiles of FIGS. 14-16 and FIG. 4 and FIG. 6, FIG. 11 shows an enlarged diagrammatic view of a further functional profile with cooperating functional regions 1711, 1712 based on the principle of a suitable press or zip closure. In this case the individual closure profile elements 1714 are of identical cross-section, each with a mirror image-symmetrical mushroom head or double T-shape or the like and engage hook-like into each other or behind each other in the form of double rows. With such a design configuration separate support regions 415 as in FIG. 4 are not required. The functional regions 1711, 1712 of FIG. 17, as shown for example in FIGS. 14-15, can also be used as fixing profiles. A closure slider 750 (see FIG. 7B) can be provided to release or connect the functional regions 1711, 1712.

Figure 18A:
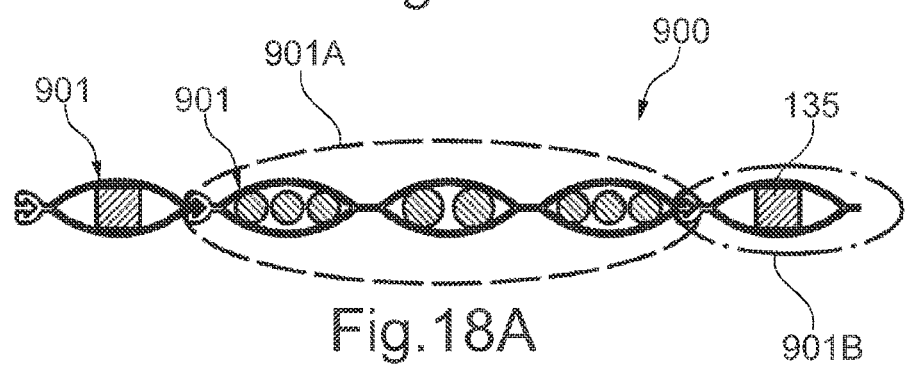
Figure 18B:
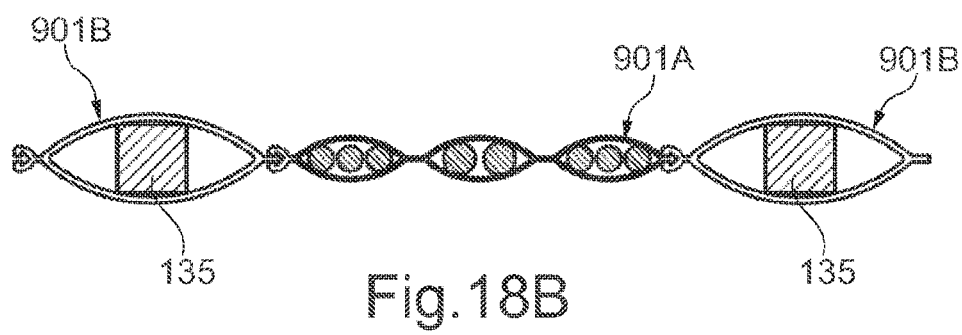

FIGS. 18A-18C show various arrangements of encasements with encasing units 901, for example similarly to FIG. 9. In FIG. 18A the two outer lateral encasing units 901 are specifically associated with two diagrammatically shown support chains 135 so that they are replaceable separately with their associated encasement 901. This also applies to FIG. 18B, in which case the encasements 901B associated with the support chains 135, for example for robust support chains 135 of larger size, are of a comparatively larger free cross-section than the line-guiding encasement 901A.

Figure 19:
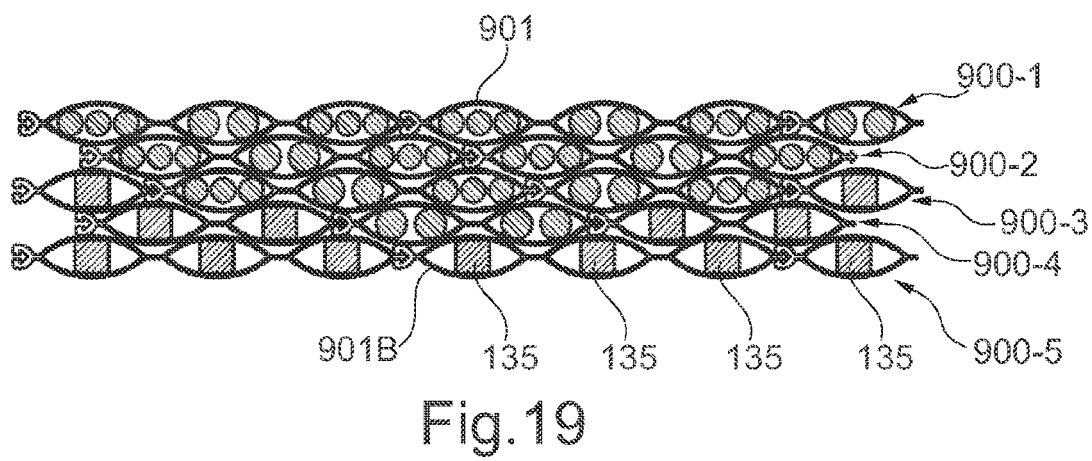

FIG. 19 shows a multilayer structure with a plurality of encasements 900-1 . . . 900-5 in which encasing units 900 according to the invention for example as shown in FIGS. 9A-9D are used, wherein some encasements 901B are provided separately for support chains 135, for example in the lower layer 900-5 which is the inner layer in the direction-changing arc.

FIGS. 13A-13E finally show a flexible encasement 1300 of the general kind set forth for clean room applications in accordance with an independent invention which is preferably but not necessarily carried out in accordance with one of the teachings of FIGS. 1-12. The encasement 1300 is displaceable based on the principle shown in FIG. 8. The two end regions 1305, 1307 of the encasement 1300 are in that case connected together by means of structurally identical clamping devices 1330, for example at a fixed point and a movable connecting point (see FIG. 8).

The clamping device 1330 shown in FIGS. 13A-13E represents a development of the principle shown in FIG. 1A and FIG. 3A. Each clamping device 1330 has a first clamping portion 1331 and a second clamping portion 1332. Each clamping portion 1331, 1332 is plate-like, for example made in the form of a shaped piece of metal, and has an inside recess or receiving means 1333 for the corresponding end region 1305 and 1307 respectively. The here approximately rectangular clamping portions 1331, 1332 each have two opposite ends 1334, 1335 which extend transversely, here perpendicularly, to a through-pass direction of the lines or the longitudinal direction L, in accordance with which encasement 1300 is fitted in the respective clamping devices 1330. In the illustrated example each recess or receiving means 1333 opens at both ends in the longitudinal direction L, that is to say outwardly at the ends 1334, 1335 so that lines can be unimpededly passed therethrough. In regard to the recess or receiving means 1333 both clamping portions 1331, 1332 are preferably of the same structural configuration and only differ in respect of the screw connection for bracing the two clamping portions 1331, 1332 relative to each other in the assembled state (FIG. 13A and FIG. 13C).

As the perspective view in FIG. 13B and the cross-sectional view in FIG. 13D (corresponding to section plane XIIID viewed from the front view in FIG. 13C) show provided in each recess 1333 at the inside are two structurally identical pressure portions 1340 respectively.

With the clamping device 1300 closed the pressure portions 1340 are pressed against the corresponding end region 1305, 1307 of the line protective guide or encasement 1300 and hold them in force-locking relationship in the longitudinal direction. In addition the pressure portions 1340 provide for dust-tight closure or serve as sealing profile members to prevent particle escape at the open end of the encasement 1300.

For that purpose each pressure portion 1340 is made from a plastic which is more compressible or softer in relation to the material of the clamping portions 1331, 1332, in particular being soft-elastic or rubber-elastic or possibly also hard-elastic, in particular in the form of hollow-chamber extrusion members here with two hollow spaces which are oval or ogival in cross-section as indicated at 1345 (FIG. 13E). The desired deformability of the pressure portions 1340 can also be achieved in another way by material selection and/or by shaping.

As a result each pressure portion 1340 is adapted to be deformable upon pressing or bracing of the clamping portions 1331, 1332 and serves inter alia as a tensile stress relief means for the lines (not shown in FIGS. 13A-13E).

As FIG. 13D best shows in that case each pressure portion 1340 is of such a size and/or arrangement that it projects or protrudes in the through-pass direction or longitudinal direction L, in particular with a corresponding narrow side 1344, beyond the respective end 1334 and 1335 of the associated clamping portions 1331 and 1332 respectively. That provides that the respective pressure portion 1340 provides at the corresponding end edge a protection affording an edge-blunting action so that the line protective guide or encasement 1300 does not come into contact with the edge of the respective end 1334 and 1335 respectively. That is advantageous in particular in relation to the end 1335 (FIG. 13A), which is disposed inwardly in relation to the configuration of the encasement 1300 or which is towards the respective other clamping device 1330 and at which the encasement 1300 is respectively introduced or fitted into the clamping device 1330.

As tests have shown, by virtue of a travel movement of the encasement 1300 (see FIG. 8, not shown in FIG. 13A in the deflected operating position) a critical location in regard to the occurrence of unwanted particles, in particular due to abrasion of the encasement 1300, is formed at the end fixing device when approaching the direction-changing arc 4 (FIG. 8). That problem can be alleviated by the simple measure of providing corner protection, here without a noticeable cost increase by virtue of the proposed pressure portions 1340.

The pressure portions 1340 project beyond the respective critical end 1335 of the associated clamping portion 1331 and 1332 and at least in the assembled state afford protection. In that respect the edge of the end 1335, that is towards the encasement 1300, can possibly also be partially embraced or covered over, but that is not required if there is a sufficiently protective projecting configuration in the longitudinal direction (see FIG. 13D) as in that way the pressure portions already afford a softer transition. In addition a suitable choice of material for the pressure portions 1340, in regard to the material of the encasement 1300, can provide a material pairing that is more advantageous in regard to abrasive wear, in comparison with the rigid material, mostly metal, of the clamping portions 3331 and 3332 respectively. The plastic of the pressure portions 1340 can be in particular harder or less soft-elastic than the plastic of the encasement 1300.

Projection in respect of the pressure portions 1340 at the opposite free end 1334 is also advantageous for the protection of lines which are passed there out of the line guide and to improve the sealing action in relation to particle escape.

Advantageously each pressure portion 1340 in the non-loaded state at the inside that faces away from the clamping portion, in the cross-section (FIG. 13D), forms one or more convexly curved or outwardly bulged surfaces 1342 in order to provide transitions or boundary surfaces which are as soft as possible at the outside of the encasement.

The profile-like pressure portions 1340 can extend with their longitudinal extent perpendicularly to the through-pass direction L continuously over the entire width of the recess 1330 as shown in FIG. 13B. Preferably each pressure portion 1340 further has two rounded narrow sides 1344.

The pressure portions 1340 can be produced inexpensively and in the form of symmetrical profile members for simplification of assembly. For fixing to the clamping portions 1331, 1332 each pressure portion can be provided at the rear with a projecting, for example toothed, fixing rib 1346 for fixing in a transverse groove in the clamping portion (FIG. 13D).

Preferably two structurally identical pressure regions 1340 are arranged in each clamping portion 1331, 1332 in mutually juxtaposed parallel spaced relationship (FIG. 13D) so that they extend perpendicularly to the through-pass direction, that is to say the longitudinal direction L of the encasement 1300.

The proposed pressure portions 1340 in the clamping devices 1300, besides edge protection between the clamping portions 1331, 1332—in particular their ends 1335 facing towards the interior of the direction-changing arc—and the encasement 1300 at the same time present better protection for the lines and reliable modular sealing in relation to particle escape and/or end tensile stress relief in respect of the lines for different line diameters. Therefore the number of required components is reduced and assembly is simplified by the pressure portions 1340.

What is claimed is:

1. A line protective guide for lines, for a clean room application, comprising an elongate flexible encasement which is displaceable reciprocatingly with the formation of a direction-changing arc between a movable run having one end connected to a movable connection and a stationary run having one end connected to a stationary connection, and wherein the flexible encasement is closable at the ends by a respective clamping device against the escape from the flexible encasement of particles generated due to wear of lines, wherein the encasement includes at least one encasing unit which forms at least one tubular receiving means for guiding at least one line, wherein each receiving means extends channel-like in a longitudinal direction from a first end to a second end;

wherein the encasement has a plurality of said tubular receiving means which extend parallel to each other to separately guide at least one line;

wherein the at least one encasing unit at least one receiving means has at least one functional region which extends in the longitudinal direction and which includes two closure profiles of a closure, wherein one of the closure profiles co-operates with the other closure profile for dust-tightly closing an opened state in which a line can be introduced or removed transversely relative to the longitudinal direction; and wherein the encasement includes a one-piece encasing unit with subdivision means which forms a plurality of parallel receiving means and has at least two closure profiles in one piece with the encasing unit.

2. The line protective guide according to claim 1, wherein the encasement includes an encasing unit made of soft-elastic plastic, which is made in one piece.

3. The line protective guide according to claim 1, wherein the encasement includes an encasing unit comprising flexurally elastic plastic, to which the at least one functional region is connected.

4. The line protective guide according to claim 3, wherein the at least one functional region is integrally connected to the encasing unit.

5. The line protective guide according to claim 1, wherein the encasement includes a multiplicity of separate encasing units and each encasing unit has two fixing strips which are in opposite relationship on both sides and which are in one piece with the encasing units, adjacent encasing units being connected together in parallel relationship by the fixing strips.

6. The line protective guide according to claim 5, wherein each encasing unit has two closure profiles in one piece with the encasing unit.

7. The line protective guide according to claim 1, wherein the encasement includes a plurality of separate encasing units, and each encasing unit forms precisely one tubular receiving means for separately guiding at least one line respectively.

8. The line protective guide according to claim 1, wherein provided for each receiving means is a pair of co-operating closure profiles in one piece with the encasing unit.

9. The line protective guide according to claim 1, wherein each encasing unit is of a cross-section which remains the same in the longitudinal direction.

10. The line protective guide according to claim 1, wherein the functional region has two closure profiles of plastic which are in interengaging conjugate relationship and which co-operate as a closure for closing at least one receiving means.

11. The line protective guide according to claim 10, wherein the interengaging closure profiles include a hook profile and a claw profile which co-operate using a barb shape thereof and/or each closure profile includes two profile elements.

12. The line protective guide according to claim 1, wherein there are provided two laterally oppositely disposed functional regions which each have a respective fixing profile, wherein the fixing profiles are of mutually matching relationship for a releasable connection by positively locking and/or force-locking relationship.

13. The line protective guide according to one claim 12, wherein the two laterally oppositely disposed functional regions each have a closure profile between receiving means and fixing profile.

14. The line protective guide according to claim 1, wherein the receiving means are connected together in parallel relationship by strip-shaped intermediate regions which predetermine the neutral fibre and/or at each closure comprising co-operating closure profiles the interface is disposed at the level of the neutral fibre.

15. An encasing unit of plastic for an elongate flexible encasement of a line protective guide, wherein the encasing unit forms at least one receiving means for guiding at least one line, which extends channel-like in a longitudinal direction from a first end to a second end;
wherein the encasing unit at one longitudinal side includes two co-operating closure profiles which extend in the longitudinal direction for dust-tightly closing an opened state in which a line can be introduced into or removed from the at least one receiving means transversely to the longitudinal direction and at least at the other longitudinal side includes a fixing profile extending in the longitudinal direction for a releasable connection to a further encasing unit.

16. An encasing unit according to claim 15, wherein the closure profiles and/or fixing profiles are of a cross-section which is the same throughout in the longitudinal direction and respectively co-operate in interengaging relationship.

17. The encasing unit according to claim 16, wherein the closure profiles and fixing profiles have co-operating profile elements of identical cross-section.

18. The encasing unit according to 15, wherein it forms a plurality of tubular receiving means for separate guidance of respectively at least one line.

19. The encasing unit according to claim 18, wherein the encasing unit at one longitudinal side has a first fixing profile and at the other longitudinal side a second fixing profile and the fixing profiles are of a mutually matching configuration for a releasable connection by positively locking and/or force-locking connection relative to each other in order to fix a plurality of structurally identical encasing units releasably to each other.

20. The encasing unit according to claim 19, wherein it forms precisely one tubular receiving means for separate guidance of at least one respective line and/or the receiving means has two co-operating closure profiles extending in the longitudinal direction and/or is produced closed in the peripheral direction around the receiving means.

21. A line protective guide for lines, for a clean room application, comprising an elongate flexible encasement which is displaceable reciprocatingly with the formation of a direction-changing arc between a movable run having one end connected to a movable connection and a stationary run having one end connected to a stationary connection, and wherein the flexible encasement is closable at the ends by a respective clamping device against the escape from the flexible encasement of particles generated due to wear of lines, wherein the encasement includes at least one encasing unit which forms at least one tubular receiving means for guiding at least one line, wherein each receiving means extends channel-like in a longitudinal direction from a first end to a second end;
wherein the encasement has a plurality of said tubular receiving means which extend parallel to each other to separately guide at least one line;
wherein the at least one encasing unit at least one receiving means has at least one functional region which extends in the longitudinal direction and which includes two closure profiles of a closure, wherein one of the closure profiles co-operates with the other closure profile for dust-tightly closing an opened state in which a line can be introduced or removed transversely relative to the longitudinal direction; and
wherein the encasement includes an encasing unit made of soft-elastic plastic, which is made in one piece.

* * * * *